United States Patent
Grier et al.

(10) Patent No.: US 11,921,023 B2
(45) Date of Patent: *Mar. 5, 2024

(54) HOLOGRAPHIC CHARACTERIZATION OF IRREGULAR PARTICLES

(71) Applicants: NEW YORK UNIVERSITY, New York, NY (US); SPHERYX, INC., New York, NY (US)

(72) Inventors: David G. Grier, New York, NY (US); Mary Ann Odete, Ridgewood, NY (US); Fook Chiong Cheong, Brooklyn, NY (US); Annemarie Winters, Waltham, MA (US); Jesse J. Elliott, New York, NY (US); Laura A. Philips, New York, NY (US)

(73) Assignees: New York University, New York, NY (US); Spheryx, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/148,499

(22) Filed: Dec. 30, 2022

(65) Prior Publication Data

US 2023/0213425 A1 Jul. 6, 2023

Related U.S. Application Data

(63) Continuation of application No. 17/079,167, filed on Oct. 23, 2020, now Pat. No. 11,543,338.
(Continued)

(51) Int. Cl.
*G01N 15/02* (2006.01)
*G01N 15/08* (2006.01)
(Continued)

(52) U.S. Cl.
CPC ......... *G01N 15/0227* (2013.01); *G01N 15/08* (2013.01); *G01N 15/088* (2013.01);
(Continued)

(58) Field of Classification Search
CPC .. G01N 15/0227; G01N 15/08; G01N 15/088; G01N 15/1434; G01N 2015/0846;
(Continued)

(56) References Cited

U.S. PATENT DOCUMENTS 3,069,654 A 12/1962 Hough
3,551,018 A 12/1970 Stetson
(Continued)

FOREIGN PATENT DOCUMENTS

CA 1159674 A1 1/1984
CN 1886684 A 12/2006
(Continued)

OTHER PUBLICATIONS

"Immunogenicity Assessment for Therapeutic Protein Products," Food and Drug Administration, 39 pages (2014).
(Continued)

*Primary Examiner* — Michael A Lyons
*Assistant Examiner* — Omar H Nixon
(74) *Attorney, Agent, or Firm* — Foley & Lardner LLP

(57) ABSTRACT

Holographic Video Microscopy analysis of non-spherical particles is disclosed herein. Properties of the particles are determined by application of light scattering theory to holography data. Effective sphere theory is applied to provide information regarding the reflective index of a sphere that includes a target particle. Known particles may be co-dispersed with unknown particles in a medium and the holographic video microscopy is used to determine properties, such as porosity, of the unknown particles.

8 Claims, 5 Drawing Sheets

Related U.S. Application Data

(60) Provisional application No. 62/926,092, filed on Oct. 25, 2019.

(51) Int. Cl.
  *G03H 1/00* (2006.01)
  *G03H 1/04* (2006.01)
  *G06T 7/62* (2017.01)

(52) U.S. Cl.
  CPC ......... *G03H 1/0005* (2013.01); *G03H 1/0443* (2013.01); *G06T 7/62* (2017.01); *G01N 2015/0846* (2013.01); *G01N 15/1434* (2013.01); *G03H 2001/0033* (2013.01); *G03H 2001/005* (2013.01); *G03H 2210/55* (2013.01); *G06T 2207/10016* (2013.01); *G06T 2207/10056* (2013.01)

(58) Field of Classification Search
  CPC ............. G06T 7/62; G06T 2207/10016; G06T 2207/10056; G03H 1/0005; G03H 1/0443; G03H 2001/0033; G03H 2001/005; G03H 2210/55
  See application file for complete search history.

(56) References Cited

U.S. PATENT DOCUMENTS

| | | |
|---|---|---|
| 4,532,422 A | 7/1985 | Nomura et al. |
| 4,540,285 A | 9/1985 | Amer |
| 4,627,729 A | 12/1986 | Breuckmann et al. |
| 4,740,079 A | 4/1988 | Koizumi et al. |
| 4,986,659 A | 1/1991 | Bachalo |
| 4,998,788 A | 3/1991 | Osakabe et al. |
| 5,095,207 A | 3/1992 | Tong |
| 5,146,086 A | 9/1992 | De et al. |
| 5,373,727 A | 12/1994 | Heller et al. |
| 5,796,498 A | 8/1998 | French |
| 5,880,841 A | 3/1999 | Marron et al. |
| 5,939,716 A | 8/1999 | Neal |
| 6,055,106 A | 4/2000 | Grier et al. |
| 6,097,488 A | 8/2000 | Grek et al. |
| 6,214,560 B1 | 4/2001 | Yguerabide et al. |
| 6,281,994 B1 | 8/2001 | Horikoshi et al. |
| 6,424,677 B1 | 7/2002 | Moeller et al. |
| 6,480,285 B1 | 11/2002 | Hill |
| 6,507,839 B1 | 1/2003 | Ponte |
| 6,519,033 B1 | 2/2003 | Quist et al. |
| 6,624,940 B1 | 9/2003 | Grier et al. |
| 6,680,798 B2 | 1/2004 | Kreuzer |
| 6,710,874 B2 | 3/2004 | Mavliev |
| 6,797,942 B2 | 9/2004 | Grier et al. |
| 6,815,664 B2 | 11/2004 | Wang et al. |
| 6,850,363 B1 | 2/2005 | Wendenburg et al. |
| 6,858,833 B2 | 2/2005 | Curtis et al. |
| 6,977,767 B2 | 12/2005 | Sarychev et al. |
| 6,995,351 B2 | 2/2006 | Curtis et al. |
| 7,001,721 B1 | 2/2006 | Whitcombe et al. |
| 7,109,473 B2 | 9/2006 | Grier et al. |
| 7,133,203 B2 | 11/2006 | Grier et al. |
| 7,161,140 B2 | 1/2007 | Grier et al. |
| 7,218,112 B2 | 5/2007 | Ladebeck et al. |
| 7,232,989 B2 | 6/2007 | Grier et al. |
| 7,233,423 B2 | 6/2007 | Grier |
| 7,248,282 B2 | 7/2007 | Maddison |
| 7,276,170 B2 | 10/2007 | Oakey et al. |
| 7,324,282 B2 | 1/2008 | Grier et al. |
| 7,338,168 B2 | 3/2008 | Cartlidge et al. |
| 7,351,953 B2 | 4/2008 | Grier et al. |
| 7,473,890 B2 | 1/2009 | Grier et al. |
| 7,482,577 B2 | 1/2009 | Gruber et al. |
| 7,491,928 B2 | 2/2009 | Roichman et al. |
| 7,515,953 B2 | 4/2009 | Madar et al. |
| 7,532,327 B2 | 5/2009 | Bloom et al. |
| 7,835,051 B2 | 11/2010 | Roichman et al. |
| 7,839,551 B2 | 11/2010 | Lee et al. |
| 7,869,011 B2 | 1/2011 | Christensen et al. |
| 7,875,845 B2 | 1/2011 | Plewa et al. |
| 7,908,300 B2 | 3/2011 | Stluka et al. |
| 7,929,132 B2 | 4/2011 | Lupton et al. |
| 8,059,321 B2 | 11/2011 | Roichman et al. |
| 8,119,988 B2 | 2/2012 | Daido et al. |
| 8,128,242 B2 | 3/2012 | Grier et al. |
| 8,299,789 B2 | 10/2012 | Heid et al. |
| 8,331,019 B2 | 12/2012 | Cheong et al. |
| 8,405,395 B2 | 3/2013 | Setsompop et al. |
| 8,431,884 B2 | 4/2013 | Grier |
| 8,680,861 B1 | 3/2014 | Morrone |
| 8,766,169 B2 | 7/2014 | Grier et al. |
| 8,791,053 B2 | 7/2014 | Christensen et al. |
| 8,791,985 B2 | 7/2014 | Grier et al. |
| 9,176,152 B2 | 11/2015 | Knutson et al. |
| 9,316,578 B2 | 4/2016 | Grier et al. |
| 9,767,341 B2 | 9/2017 | Ozcan et al. |
| 9,810,894 B2 | 11/2017 | Grier et al. |
| 9,897,675 B2 | 2/2018 | Setsompop et al. |
| 9,933,351 B2 | 4/2018 | Kent et al. |
| 11,085,864 B2 | 8/2021 | Grier et al. |
| 11,385,157 B2 | 7/2022 | Grier et al. |
| 11,543,338 B2 * | 1/2023 | Grier .................. G01N 15/1468 |
| 2002/0069242 A1 | 6/2002 | Berns |
| 2003/0007894 A1 | 1/2003 | Wang et al. |
| 2003/0021016 A1 | 1/2003 | Grier |
| 2003/0021382 A1 | 1/2003 | Iwanczyk et al. |
| 2003/0047676 A1 | 3/2003 | Grier et al. |
| 2003/0089117 A1 | 5/2003 | Mao et al. |
| 2003/0132373 A1 | 7/2003 | Curtis et al. |
| 2004/0004716 A1 | 1/2004 | Mavliev |
| 2004/0004717 A1 | 1/2004 | Reed |
| 2004/0058455 A1 | 3/2004 | Grier et al. |
| 2004/0072372 A1 | 4/2004 | Seul et al. |
| 2004/0156098 A1 | 8/2004 | Dubois et al. |
| 2004/0180363 A1 | 9/2004 | Gruber et al. |
| 2004/0207922 A1 | 10/2004 | Grier et al. |
| 2005/0017161 A1 | 1/2005 | Grier et al. |
| 2005/0059846 A1 | 3/2005 | Kohda et al. |
| 2005/0141757 A1 | 6/2005 | Ayache et al. |
| 2005/0173622 A1 | 8/2005 | Curtis et al. |
| 2005/0176134 A1 | 8/2005 | Grier et al. |
| 2006/0003252 A1 | 1/2006 | Hirayama et al. |
| 2006/0029634 A1 | 2/2006 | Berg et al. |
| 2006/0127369 A1 | 6/2006 | Christensen et al. |
| 2006/0131494 A1 | 6/2006 | Grier et al. |
| 2006/0163463 A1 | 7/2006 | Grier |
| 2007/0023622 A1 | 2/2007 | Grier et al. |
| 2007/0070303 A1 | 3/2007 | Yonekubo |
| 2007/0091442 A1 | 4/2007 | MacDonald et al. |
| 2007/0177774 A1 | 8/2007 | Kuo |
| 2007/0242269 A1 | 10/2007 | Trainer |
| 2008/0037004 A1 | 2/2008 | Shamir et al. |
| 2008/0094675 A1 | 4/2008 | Roichman et al. |
| 2008/0100840 A1 | 5/2008 | Oma et al. |
| 2008/0137161 A1 | 6/2008 | Roichman et al. |
| 2008/0150532 A1 | 6/2008 | Slavin et al. |
| 2008/0285099 A1 | 11/2008 | Knutson et al. |
| 2009/0027747 A1 | 1/2009 | Lee et al. |
| 2009/0059008 A1 | 3/2009 | Ishii |
| 2009/0073563 A1 | 3/2009 | Betzig |
| 2009/0079981 A1 | 3/2009 | Holve |
| 2009/0128825 A1 | 5/2009 | Akcakir |
| 2009/0132074 A1 | 5/2009 | Yamada |
| 2009/0135432 A1 | 5/2009 | Betzig |
| 2009/0170186 A1 | 7/2009 | Wu et al. |
| 2010/0055031 A1 | 3/2010 | Ahn |
| 2010/0090694 A1 | 4/2010 | Heid et al. |
| 2010/0150408 A1 | 6/2010 | Ishikawa |
| 2010/0172591 A1 | 7/2010 | Ishikawa |
| 2010/0241357 A1 | 9/2010 | Chan et al. |
| 2010/0253986 A1 | 10/2010 | Awatsuji et al. |
| 2010/0259263 A1 | 10/2010 | Holland et al. |
| 2011/0043607 A1 | 2/2011 | Grier et al. |
| 2011/0071764 A1 | 3/2011 | Prather et al. |
| 2011/0126914 A1 | 6/2011 | Hartman et al. |

(56) References Cited

U.S. PATENT DOCUMENTS

| | | |
|---|---|---|
| 2011/0130348 A1 | 6/2011 | Ting et al. |
| 2011/0157599 A1 | 6/2011 | Weaver et al. |
| 2011/0176190 A1 | 7/2011 | Golan et al. |
| 2011/0225196 A1 | 9/2011 | Haseyama |
| 2011/0292363 A1 | 12/2011 | Ivey et al. |
| 2012/0038931 A1 | 2/2012 | Jourdain et al. |
| 2012/0135535 A1 | 5/2012 | Grier et al. |
| 2012/0177543 A1 | 7/2012 | Battrell et al. |
| 2012/0183947 A1 | 7/2012 | Mueth et al. |
| 2012/0235678 A1 | 9/2012 | Seiberlich et al. |
| 2012/0256626 A1 | 10/2012 | Adalsteinsson et al. |
| 2012/0273664 A1 | 11/2012 | Grier et al. |
| 2013/0038326 A1 | 2/2013 | Amadon et al. |
| 2013/0271135 A1 | 10/2013 | Ozen et al. |
| 2013/0278743 A1* | 10/2013 | Cheong ............... G01N 15/088 348/79 |
| 2013/0308135 A1 | 11/2013 | Dubois et al. |
| 2014/0148547 A1 | 5/2014 | Ishida et al. |
| 2014/0170735 A1 | 6/2014 | Holmes |
| 2014/0177932 A1 | 6/2014 | Milne et al. |
| 2014/0253126 A1 | 9/2014 | Habara et al. |
| 2014/0313510 A1 | 10/2014 | Schmidt et al. |
| 2014/0333935 A1 | 11/2014 | Grier et al. |
| 2015/0002150 A1 | 1/2015 | Weissler et al. |
| 2015/0062587 A1 | 3/2015 | Shpaisman |
| 2015/0300963 A1 | 10/2015 | Haidekker et al. |
| 2015/0301141 A1 | 10/2015 | Griswold et al. |
| 2015/0346300 A1 | 12/2015 | Setsompop et al. |
| 2016/0116559 A1 | 4/2016 | Cohen |
| 2016/0282436 A1 | 9/2016 | Cloos |
| 2016/0291105 A1 | 10/2016 | Knoll et al. |
| 2016/0291107 A1 | 10/2016 | Rosen et al. |
| 2017/0209864 A1 | 7/2017 | Grisham et al. |
| 2017/0357211 A1 | 12/2017 | Moon et al. |
| 2018/0252628 A1 | 9/2018 | Ruffner et al. |
| 2019/0033414 A1 | 1/2019 | Sofka et al. |
| 2019/0033415 A1 | 1/2019 | Sofka et al. |
| 2021/0199552 A1 | 7/2021 | Van Oostrum et al. |

FOREIGN PATENT DOCUMENTS

| | | |
|---|---|---|
| CN | 103238120 A | 8/2013 |
| CN | 105164508 A | 12/2015 |
| EP | 0 354 37 A1 | 9/1981 |
| EP | 0 278 714 A2 | 8/1988 |
| EP | 1 855 081 A1 | 11/2007 |
| EP | 1 865 430 A2 | 12/2007 |
| GB | 2 408 587 A | 6/2005 |
| JP | 55-096976 A | 7/1980 |
| JP | 03-251388 A | 11/1991 |
| JP | 03-251888 A | 11/1991 |
| JP | 2000-225302 A | 8/2000 |
| JP | 2001-034148 A | 2/2001 |
| JP | 2004-517742 A | 6/2004 |
| JP | 2005-512127 A | 4/2005 |
| JP | 2007-279475 A | 10/2007 |
| JP | 2011-502256 A | 1/2011 |
| JP | 2011-525967 A | 9/2011 |
| JP | 2012-515351 A1 | 7/2012 |
| JP | 2014-503794 A | 2/2014 |
| WO | WO-01/15288 A1 | 3/2001 |
| WO | WO-03/048868 A1 | 6/2003 |
| WO | WO-2005/027031 A2 | 3/2005 |
| WO | WO-2005/114151 A1 | 12/2005 |
| WO | WO-2006/034129 A2 | 3/2006 |
| WO | WO-2008/092107 A1 | 7/2008 |
| WO | WO-2008/127410 A2 | 10/2008 |
| WO | WO-2008/142560 A2 | 11/2008 |
| WO | WO-2009/059008 A1 | 5/2009 |
| WO | WO-2010/101671 A1 | 9/2010 |
| WO | WO-2012/061752 A2 | 5/2012 |
| WO | WO-2013/080164 A1 | 6/2013 |
| WO | WO-2013/126554 A1 | 8/2013 |
| WO | WO-2015/073894 A2 | 5/2015 |
| WO | WO-2015/200512 A1 | 12/2015 |
| WO | WO-2017/040158 A1 | 3/2017 |
| WO | WO-2021/249692 A1 | 12/2021 |
| WO | WO-2021/249693 A1 | 12/2021 |

OTHER PUBLICATIONS

Agarwal, et al., "Manipulation and assembly of nanowires with holographic optical traps," Optics Express 13(22), pp. 8906-8912 (2005).

Allier, et al., "Label-free cell viability assay using lens-free microscopy," SPIE Proceedings 10497, 7 pages (2018).

Alm, et al., "Cells and Holograms—Holograms and Digital Holographic Microscopy as a Tool to Study the Morphology of Living Cells," Holography—Basic Principles and Contemporary Applications, pp. 335-351 (2013).

Altman & Grier, "CATCH: Characterizing and Tracking Colloids Holographically Using Deep Neural Networks," The Journal of Physical Chemistry B 124(9), pp. 1602-1610 (2020).

Altman, et al., "Holographic characterization and tracking of colloidal dimers in the effective-sphere approximation," Soft Matter 17(10), pp. 2695-2703 (2021).

Arlt, et al., "Optical micromanipulation using a Bessel light beam," Optics Communications 197(4-6), pp. 239-245 (2001).

Arrizon, et al., "Accurate encoding of arbitrary complex fields with amplitude-only liquid crystal spatial light modulators," Optics Express 13(20), pp. 7913-7927 (2005).

Ashkin, "History of optical trapping and manipulation of small-neutral particle, atoms, and molecules," IEEE Journal of Selected Topics in Quantum Electronics 6(6), pp. 841-856 (2000).

Ashkin, "Optical trapping and manipulation of neutral particles using?lasers," Proceedings of the National Academy of Sciences 94(10), pp. 4853-4860 (1997).

Ashkin, et al., "Observation of as single-beam gradient force optical trap for dielectric particles," Optics Letters 11(5), pp. 288-290 (1986).

Aspnes, "Local-field effects and effective-medium theory: A microscopic perspective," American Journal of Physics 50(8), pp. 704-709 (1982).

Atherton & Kerbyson, "Size invariant circle detection," Image and Vision Computing 17(11), pp. 795-803 (1999).

Ball, et al., "Complexation Mechanism of Bovine Serum Albumin and Poly(allylamine hydrochloride)," The Journal of Physical Chemistry B 106(9), pp. 2357-2364 (2002).

Ballard, "Generalizing the Hough transform to detect arbitrary shapes," Pattern Recognition 13(2), pp. 111-122 (1981).

Basim & Moudgil, "Effect of Soft Agglomerates on CMP Slurry Performance," Journal of Colloid and Interface Science 256(1), pp. 137-142 (2002).

Basim, et al., "Effect of Particle Size of Chemical Mechanical Polishing Slurries for Enhanced Polishing with Minimal Defects," Journal of the Electrochemical Society 147(9), pp. 3523-3528 (2000).

Ben-Eliezer, et al., "A New Model-Based Technique for Accurate Reconstruction of T2 Relaxation Maps from Fast Spin-Echo Data," Proceedings of the International Society for Magnetic Resonance in Medicine 21, p. 2453 (2013).

Biancaniello, et al., "Colloidal Interactions and Self-Assembly Using DNA Hybridization," Physical Review Letters 94(5):058302, 4 pages (2005).

Bishop, "Inverse problems," Neural Networks for Pattern Recognition, p. 207 (1995).

Boas, et al., "Scattering of diffuse photon density waves by spherical inhomogeneities within turbid media: analytic solution and applications," Proceedings of the National Academy of Sciences 91(11), pp. 4887-4891 (1994).

Bohren, et al., "Absorption and Scattering of Light by Small Particles," Wiley Interscience (1983).

Bolognesi, et al., "Digital holographic tracking of microprobes for multipoint viscosity measurements," Optics Express 19(20), pp. 19245-19254 (2011).

(56) References Cited

OTHER PUBLICATIONS

Botstein & Fink, "Yeast: An Experimental Organism for 21st Century Biology," Genetics 189(3), pp. 695-704 (2011).
Bourquard, et al., "A practical inverse-problem approach to digital holographic reconstruction," Optics Express 23(3), pp. 3417-3433 (2013).
Carpenter, et al., "Overlooking subvisible particles in therapeutic protein products: Gaps that may compromise product quality," Journal of Pharmaceutical Sciences 98(4), pp. 1201-1205 (2009).
Chan, et al., "Morphological observation and analysis using automated image cytometry for the comparison of trypan blue and fluorescence-based viability detection method," Cytotechnology 67, pp. 461-473 (2014).
Chan, et al., "Observation and quantification of the morphological effect of trypan blue rupturing dead or dying cells," PLoS ONE 15(1): e0227950, 17 pages (2020).
Chang & Lin, "LIBSVM: A library for support vector machines," ACM Transactions on Intelligent Systems and Technology 2(3), 27, 27 pages (2011).
Chang & Lin, "Training v-Support Vector Regression: Theory and Algorithms, " Neural Computation 14(8), pp. 1959-1977 (2002).
Chen, et al., "Magnetic resonance fingerprinting (MRF) for rapid quantitative abdominal imaging," Proceedings of the International Society for Magnetic Resonance in Medicine 22, p. 0561 (2014).
Cheong & Grier, "Rotational and translational diffusion of copper oxide nanorods measured with holographic video microscopy," Optics Express 18(7), pp. 6555-6562 (2010).
Cheong, et al., "Flow visualization and flow cytometry with holographic video microscopy," Optics Express 17(15), pp. 13071-13079 (2009).
Cheong, et al., "Holographic characterization of colloidal particles in turbid media," Applied Physics Letters 111, 153702, 5 pages (2017).
Cheong, et al., "Holographic characterization of individual colloidal spheres' porosities," Soft Matter 7(15), pp. 6816-6819 (2011).
Cheong, et al., "Holographic microrheology of polysaccharides from *Streptococcus mutans* biofilms," Rheologica Acta 48(1), pp. 109-115 (2009).
Cheong, et al., "Rapid, High-Throughput Tracking of Bacterial Motility in 3D via Phase-Contrast Holographic Video Microscopy," Biophysical Journal 108(5), pp. 1248-1256 (2015).
Cheong, et al., "Strategies for three-dimensional particle tracking with holographic video microscopy," Optics Express 18(13), pp. 13563-13573 (2010).
Cheong, et al., "Technical note: Characterizing individual milk fat globules with holographic video microscopy," Journal of Dairy Science 92(1), pp. 95-99 (2009).
Chia, et al., "A Review of Analytical Techniques for Identifying Contaminants in the Semiconductor Industry," Journal of the IEST 45(1), pp. 37-44 (2002).
Cizmar, et al., "Sub-micron particle organization by self-imaging of non-diffracting beams," New Journal of Physics 8(43), 23 pages (2006).
Cloos, et al., "Plug and Play Parallel Transmission at 7 and 9.4 Tesla Based on Principles from MR Fingerprinting," Proceedings of the International Society for Magnetic Resonance in Medicine 22, p. 0542 (2014).
Cojoc, et al., "Laser trapping and micro-manipulation using optical vortices," Microelectronic Engineering 78-79, pp. 125-131 (2005).
Colomb, et al., "Polarization microscopy by use of digital holography: application to optical-fiber birefringence measurements," Applied Optics 44(21), pp. 4461-4469 (2005).
Costantino, et al., "Moisture-Induced Aggregation of Lyophilized Insulin," 11(1), pp. 21-29 (1994).
Crocker & Grier, "Methods of Digital Video Microscopy for Colloidal Studies," Journal of Colloid and Interface Science 179(1), pp. 298-310 (1996).
Crocker & Grier, "Methods of Digital Video Microscopy for Colloidal Studies," Methods of Digital Video Microscopy for Colloidal Studies 179(1), pp. 298-310 (1996).
Crocker & Grier, "Microscopic measurement of the pair interaction potential of charge-stabilized colloid," Physical Review Letters 73(2), pp. 352-355 (1994).
Crocker, et al., "Entropic Attraction and Repulsion in Binary Colloids Probed with a Line Optical Tweezer," Physical Review Letters 82(21), pp. 4352-4355 (1999).
Cuche, et al., "Simultaneous amplitude-contrast and quantitative phase-contrast microscopy by numerical reconstruction of Fresnel off-axis holograms," Applied Optics 38(34), pp. 6994-7001 (1999).
Curtis & Grier, "Modulated optical vortices," Optics Letters 28(11), pp. 872-874 (2003).
Curtis & Grier, "Structure of Optical Vortices," Physical Review Letters 90(13):133901, 4 pages (2003).
Curtis, et al., "Dynamic holographic optical tweezers," Optics Communications 207(1-6), pp. 169-175 (2002).
Daimon & Masumura, "Measurement of the refractive index of distilled water from the near-infrared region to the ultraviolet region," Applied Optics 46(18), pp. 3811-3820 (2007).
Davis, et al., "Encoding amplitude and phase information onto a binary phase-only spatial light modulator," Applied Optics 42(11), pp. 2003-2008 (2003).
Davis, et al., "Encoding amplitude information onto phase-only filters," Applied Optics 38(23), pp. 5004-5013 (1999).
Demeule, et al., "Characterization of Particles in Protein Solutions: Reaching the Limits of Current Technologies," The AAPS Journal 12(4), pp. 708-715 (2010).
Den Engelsman, et al., "Strategies for the Assessment of Protein Aggregates in Pharmaceutical Biotech Product Development," Pharmaceutical Research 28(4), pp. 920-933 (2011).
Denis, et al., "Direct Extraction of the Mean Particle Size from a Digital Hologram," Applied Optics 45(5), pp. 944-952 (2006).
Dixon, et al., "Holographic deconvolution microscopy for high-resolution particle tracking," Optics Express 19(17), pp. 16410-16417 (2011).
Dixon, et al., "Holographic particle-streak velocimetry," Optics Express 19(5), pp. 4393-4398 (2011).
Doneva, et al., "Compressed Sensing Reconstruction for Magnetic Resonance Parameter Mapping," Magnetic Resonance in Medicine 64, pp. 1114-1120 (2020).
Duda & Hart, "Use of the Hough transformation to detect lines and curves in pictures," Communications of the ACM 15(1), pp. 11-15 (1972).
Duffy, et al., "Rapid Prototyping of Microfluidic Systems in Poly(dimethylsiloxane)," Analytical Chemistry 70(23), pp. 4974-4984 (1998).
Dufrense & Grier "Optical tweezer arrays and optical substrates created with diffractive optics," Review of Scientific Instruments 69(5), pp. 1974-1977 (1998).
Dufresne, et al., "Brownian dynamics of a sphere between parallel walls," Europhysics Letters 53(2), pp. 264-270 (2001).
Dufresne, et al., "Computer-generated holographic optical tweezer arrays," Review of Scientific Instruments 72(3), pp. 1810-1816 (2001).
Duina, et al., "Budding Yeast for Budding Geneticists: A Primer on the *Saccharomyces cerevisiae* Model System," Genetics 197(1), pp. 33-48 (2014).
Dumm, "Characterization of low-level, oversize particles in abrasive powders," KONA Powder and Particle Journal 23, pp. 129-138 (2005).
Egorov, "Systematika, printsipy raboty i oblasty primeneniya datchikov (Systematics, the principle of operation and sensor applications)", Zhurnal radioelectoniki (Journal of Radio Electronics) 3, 22 pages (English abstract) (2009).
Eriksen, et al., "Fully dynamic multiple-beam optical tweezers," Optics Express 10(14), pp. 597-602 (2002).
Farrando-Perez, et al., "Direct Measurement of Microporosity and Molecular Accessibility in Stober Spheres by Adsorption Isotherms," The Journal of Physical Chemistry C 122(38), pp. 22008-22017 (2018).
Faucheux, et al., "Optical Thermal Ratchet," Physical Review Letters 74(9), pp. 1504-1507 (1995).
Faucheux, et al., "Periodic forcing of a Brownian particle," Physical Review E 51(6), pp. 5239-5250 (1995).

(56) References Cited

OTHER PUBLICATIONS

Feder, et al,. "Scaling Behavior and Cluster Fractal Dimension Determined by Light Scattering from Aggregating Proteins," Physical Review Letters 53(15), pp. 1403-1406 (1984).
Feizi, et al., "Lensfree On-chip Microscopy Achieves Accurate Measurement of Yeast Cell Viability and Concentration Using Machine Learning," Conference on Lasers and Electro-Optics, ATh4B.4, 2 pages (2017).
Feizi, et al., "Rapid, portable and cost-effective yeast cell viability and concentration analysis using lensfree on-chip microscopy and machine learning," Lab on a Chip 16(22), pp. 4350-4358 (2016).
Ferreira, et al., "Tackling Cancer with Yeast-Based Technologies," Trends in Biotechnology 37(6), pp. 592-603 (2019).
Fifth Office Action for Chinese Patent App. No. 201080009712.X, dated Mar. 11, 2015, 17 pages (with translation).
Filipe, et al., "Critical Evaluation of Nanoparticle Tracking Analysis (NTA) by NanoSight for the Measurement of Nanoparticles and Protein Aggregates," Pharmaceutical Research 27(5), pp. 796-810 (2010).
Fleet, "Yeasts in foods and beverages: impact on product quality and safety," Current Opinion in Biotechnology 18(2), pp. 170-175 (2007).
Fung & Hoang, "Assessing the Use of Digital Holographic Microscopy to Measure the Fractal Dimension of Colloidal Aggregates," Biophotonics Congress: Optics in the Life Sciences Congress, JT4A.19, 3 pages (abstract only) (2019).
Fung & Hoang, "Computational assessment of an effective-sphere model for characterizing colloidal fractal aggregates with holographic microscopy," Journal of Quantitative Spectroscopy and Radiative Transfer 236:106591, 10 pages (2019).
Fung & Manoharan, "Holographic measurements of anisotropic three-dimensional diffusion of colloidal clusters," Physical Review E 88(2), 020302(R), 9 pages (2013).
Fung, et al., "Imaging multiple colloidal particles by fitting electromagnetic scattering solutions to digital holograms," Journal of Quantitative Spectroscopy and Radiative Transfer 113(18), pp. 2482-2489 (2012).
Fung, et al., "Measuring translational, rotational, and vibrational dynamics in colloids with digital holographic microscopy," Optics Express 19(9), pp. 8051-8065 (2011).
Gabor, "A New Microscopic Principle," Nature 161, pp. 777-778 (1948).
Gahagan & Swartzlander, "Optical vortex trapping of particles," Optics Letters 21(11), pp. 827-829 (1996).
Gibson, et al., "Yeast responses to stresses associated with industrial brewery handling," FEMS Microbiology REviews 31(5), pp. 535-569 (2007).
Gleeson, et al., "Analytical approach to sorting in periodic and random potentials," Physical Review E 73(4):041102, 9 pages (2006).
Goller, et al., "Inorganic "silicone oil" microgels," Colloids and Surfaces A: Physicochemical and Engineering Aspects 123-124, pp. 183-193 (1997).
Gomes, et al., "Comparison of Yeasts as Hosts for Recombinant Protein Production," Microorganisms 6(2):38, 23 pages (2018).
Goodman, "Statistical Properties of Laser Speckle Patterns," Laser Speckle and Related Phenomena, pp. 9-75 (2007).
Gopinathan & Grier, "Statistically Locked-In Transport through Periodic Potential Landscapes," Physical Review Letters 92(13):130602, 4 pages (2004).
Gorbenko, et al., "Quantification of changes in cellular morphology during cell necrosis obtained from 3D refractive index distributions," Journal of Physics: Conference Series 1236:012015, 6 pages (2019).
Graesslin, et al., "Fully Integrated Whole Body 3T MRI System for Parallel RF Transmission", Proceedings of the International Society for Magnetic Resonance in Medicine 15, p. 1007 (2007).
Graesslin, et al., "Whole Body 3T MRI System with Eight Parallel RF Transmission Channels," Proceedings of the International Society for Magnetic Resonance in Medicine 14, p. 129 (2006).

Grier & Roichman, "Holographic optical trapping," Applied Optics 45(5), pp. 880-887 (2006).
Grier, "A revolution in optical manipulation," Nature 424, pp. 810-816 (2003).
Grier, "Downloadable holographic microscopy software written in IDL, the Interactive Data Language," retrieved from http://physics.nyu.edu/grierlab/software.html, 3 pages (2014).
Grier, "Optical tweezers in colloid and interface science," Current Opinion in Colloid & Interface Science 2(3), pp. 264-270 (1997).
Guaragnella, et al., "The expanding role of yeast in cancer research and diagnosis: insights into the function of the oncosuppressors p53 and BRCA1/2," FEMS Yeast Research 14(1), pp. 2-16 (2014).
Hagiwara, et al., "Fractal Analysis of Aggregates Formed by Heating Dilute BSA Solutions Using Light Scattering Methods," Bioscience, Biotechnology, and Biochemistry 60(11), pp. 1757-1763 (1996).
Haist, et al., "Using Graphics Boards to Compute Holograms," Computing in Science & Engineering 8, pp. 8-13 (2006).
Hannel, et al., "Holographic characterization of imperfect colloidal spheres," Applied Physics Letters 107(14), 141905, 4 pages (2015).
He, et al., "Optical Particle Trapping with Higher-order Doughnut Beams Produced Using High Efficiency Computer Generated Holograms," Journal of Modern Optics 42(1), pp. 217-223 (1995).
Hermann, et al., "Separation of suspended patricles in microfluidic systems by directional-locking in periodic fields," Physical Review E 79(6):061404, 9 pages (2009).
Hillman, et al., "Microscopic particle discrimination using spatially-resolved Fourier-holographic light scattering angular spectroscopy," Optics Express 14(23), pp. 11088-11102 (2006).
Hirai, et al., "Laser Photophoresis of a Single Droplet in Oil in Water Emulsions," Langmuir 12(23), pp. 5570-5575 (1996).
Hogg, "Issues in Particle Size Analysis," KONA Powder and Particle Journal 26, pp. 81-93 (2008).
Hollitt, "A convolution approach to the circle Hough transform for arbitrary radius," Machine Vision and Applications 24(4), pp. 683-694 (2013).
Holm, et al., "Aggregation and fibrillation of bovine serum albumin," Biochimica et Biophysica Acta (BBA) - Proteins and Proteomics 1774(9), pp. 1128-1138 (2007).
Huang, et al., "Efficient protein production by yeast requires global tuning of metabolism," Nature Communications 8:1131, 12 pages (2017).
Huang, et al., "Optical tweezers as sub-pico-newton force transducers," Optics Communications 195(1-4), pp. 41-48 (2001).
Hukkanen & Braatz, "Measurement of particle size distribution in suspension polymerization using in situ laser backscattering," Sensors and Actuators B: Chemical 96(1-2), pp. 451-459 (2003).
International Search Report & Written Opinion for PCT/US2008/081794 dated Feb. 12, 2009, 5 pages.
International Search Report & Written Opinion for PCT/US2010/021045 dated Apr. 30, 2010, 6 pages.
International Search Report & Written Opinion for PCT/US2012/051542 dated Nov. 22, 2012, 6 pages.
International Search Report and Written Opinion for PCT/US2011/059400 dated May 30, 2012, 7 pages.
International Search Report and Written Opinion for PCT/US2015/015666, dated Jan. 7, 2016, 11 pages.
International Search Report and Written Opinion for PCT/US2015/037472, dated Sep. 23, 2015, 9 pages.
International Search Report and Written Opinion for PCT/US2015/055154, dated Jan. 7, 2016, 11 pages.
International Search Report and Written Opinion for PCT/US2015/060183, dated Feb. 2, 2016, 9 pages.
International Search Report and Written Opinion for PCT/US2016/051946 dated Nov. 28, 2016, 7 pages.
International Search Report and Written Opinion for PCT/US2017/016857 dated Jun. 9, 2017, 13 pages.
International Search Report and Written Opinion for PCT/US2017/048496 dated Nov. 9, 2017, 10 pages.
Ishimaru, "Diffusion of light in turbid material," Applied Optics 28(12), pp. 2210-2215 (1989).
Jones, et al., "Silicone oil induced aggregation of proteins," Journal of Pharmaceutical Sciences 94(4), pp. 918-927 (2005).

(56) References Cited

OTHER PUBLICATIONS

Kao, et al., "Tracking of Single Fluorescent Particles in Three Dimensions: Use of Cylindrical Optics to Encode Particle Position," Biophysical Journal 67(3), pp. 1291-1300 (1994).
Kasimbeg, et al., "Holographic Characterization of Protein Aggregates in the Presence of Silicone Oil and Surfactants," Journal of Pharmaceutical Sciences 108(1), pp. 155-161 (2019).
Katscher, et al., "Parallel RF transmission in MRI", NMR in Biomedicine 19(3), pp. 393-400 (2006).
Katscher, et al., "RF Encoding Using a Multielement Parallel Transmit System," Magnetic Resonance in Medicine 63(6), pp. 1463-1470 (2010).
Kim, et al., "Yeast synthetic biology for the production of recombinant therapeutic proteins," FEMS Yeast Research 15(1), pp. 1-16 (2015).
Knoll, et al., "Simultaneous MR-PET Reconstruction Using Multi Sensor Compressed Sensing and Joint Sparsity," Proceedings of the International Society for Magnetic Resonance in Medicine 22, p. 0082 (2014).
Kolomenkin, et al., "Geometric Voting Algorithm for Star Trackers," IEEE Transactions on Aerospace and Electronic Systems 44(2), 441-456 (2008).
Korda, et al., "Kinetically Locked-In Colloidal Transport in an Array of Optical Tweezers," Physical Review Letters 89(12):128301, 4 pages (2002).
Kosters, et al., "EMRECON: An Expectation Maximization Based Image Reconstruction Framework for Emission Tomography Data", 2011 IEEE Nuclear Science Symposium Conference Record, pp. 4365-4368 (2011).
Krishnatreya, et al., "Fast feature identification for holographic tracking: the orientation alignment transform," Optics Express 22(11), pp. 12773-12778 (2014).
Krishnatreya, et al., "Measuring Boltzmann's constant through holographic video microscopy of a single colloidal sphere," American Journal of Physics 82(1):23, 10 pages (2014).
Krishnatreya, et al., "Measuring Boltzmann's constant through holographic video microscopy of a single colloidal sphere," American Journal of Physics 82(23), pp. 23-31 (2014).
Kwolek-Mirkek & Zadrag-Tecza, "Comparison of methods used for assessing the viability and vitality of yeast cells," FEMS Yeast Research 14(7), pp. 1068-1079 (2014).
Lacasta, et al., "Sorting mesoscopic particles driven through periodic potential landscapes," Modern Physics Letters B 20(23), pp. 1427-1442 (2006).
Ladavac, et al., "Sorting mesoscopic objects with periodic potential landscapes: Optical fractionation," Physical Review E 70(1):010901, 4 pages (2004).
Lee & Grier, "One-dimensional optical thermal ratchets," Journal of Physics: Condensed Matter 17(47), 7 pages (2005).
Lee & Grier, "Robustness of holographic optical traps against phase scaling errors," Optics Express 13(19), pp. 7458-7465 (2005).
Lee, et al., "Characterizing and tracking single colloidal particles with video holographic microscopy," Optics Express 15(26), pp. 18275-18282 (2007).
Lee, et al., "Holographic microscopy of holographically trapped three-dimensional structures", Optics Express 15(4), pp. 1505-1512 (2007).
Lee, et al., "Optical solenoid beams," Optics Express 18(7), pp. 6988-6993 (2010).
Lee, et al., "Statistics of speckle propagation through the turbulent atmosphere," Journal of the Optical Society of America 66(11), pp. 1164-1172 (1976).
Li, et al., "Understanding Stober Silica's Pore Characteristics Measured by Gas Adsorption," Langmuir 31(2), pp. 824-832 (2015).
Liesner, et al., "Multi-functional optical tweezers using computer-generated holograms," Optics Communications 185(1-3), pp. 77-82 (2000).
Lin, et al., "Direct measurements of constrained Brownian motion of an isolated sphere between two walls," Physical Review E 62(3), pp. 3909-3919 (2000).
Lobry & Ostrowsky, "Diffusion of Brownian particles trapped between two walls: Theory and dynamic-light-scattering measurements," Physical Review B 53(18), pp. 12050-12056 (1996).
Lodolo, et al., "The yeast *Saccharomyces cerevisiae*—the main character in beer brewing," FEMS Yeast Research 8(7), pp. 1018-1036 (2008).
Ma, et al., "Determination of complex refractive index of polystyrene microspheres," Physics in Medicine & Biology 48, pp. 4165-4172 (2003).
Ma, et al., "Magnetic resonance fingerprinting," Nature 495, pp. 187-193 (2013).
MacDonald, et al., "Microfluidic sorting in an optical lattice," Letters to Nature 426, pp. 412-424 (2003).
Maicas, "The Role of Yeasts in Fermentation Processes," Microorganisms 8(8):1142, 8 pages (2020).
Malitson, "Interspecimen Comparison of the Refractive Index of Fused Silica," Journal of the Optical Society of America 55(10), pp. 1205-1209 (1965).
Maret & Wolf, "Multiple light scattering from disordered media. The effect of brownian motion of scatterers," Zeitschrift fur Physik B Condensed Matter 65(4), pp. 409-413 (1987).
Markel, "Introduction to the Maxwell Garnett approximation: tutorial," Journal of the Optical Society of America A 33(7), pp. 1244-1256 (2016).
Markel, et al., "Introduction to the Maxwell Garnett approximation: tutorial," Journal of the Optical Society of America A 33(7), pp. 1244-1256 (2016).
Maschke, et al., "Micronization of Insulin by High Pressure Homogenization," Pharmaceutical Research 23(9), pp. 2220-2229 (2006).
Mascotti, et al., "HPC viability measurement: trypan blue versus acridine orange and propidium iodide," Transfusion 40(6), pp. 693-696 (2000).
Meakin, "Fractal Aggregates", Advances in Colloid and Interface Science 28, pp. 249-331 (1988).
Mernier, et al., "Cell viability assessment by flow cytometry using yeast as cell model," Sensors & Actuators B: Chemical 154(2), pp. 160-163 (2011).
Messmer, et al., "GPULib: GPU Computing in High-Level Languages," Computing in Science & Engineering 10(2008.05), pp. 70-73 (2008).
Midtvedt, et al., "Label-free spatio-temporal monitoring of cytosolic mass, osmolarity, and volume in living cells," Nature Communications 10:340, 9 pages (2019).
Milne, et al., "Fractionation of polydisperse colloid with acousto-optically generated potential enery landscapes," Optics Letters 32(9), pp. 1144-1146 (2007).
Moh, et al., "Multiple optical line traps using a single phase-only rectangular ridge," Applied Physics B 80(8), pp. 973-976 (2005).
Moreno, et al., "Particle positioning from charge-coupled device images by the generalized Lorenz- Mie theory and comparison with experiment," Applied Optics 39(28), pp. 5117-5124 (2000).
Moyses, et al., "Robustness of Lorenz-Mie microscopy against defects in illumination," Optics Express 21(5), pp. 5968-5973 (2013).
Mueller, et al., "The Alzheimer's Disease Neuroimaging Initiative," Neuroimaging Clinics of North America 15(4), pp. 869-877 (2005).
Nebrensky, et al., "A Particle Imaging and Analysis System for Underwater Holograms," Optical Methods and Data Processing in Heat and Fluid Flow, pp. 79-92 (2002).
Nelles, et al., "Dual-Source Parallel RF Transmission for Clinical MR Imaging of the Spine at 3.0 T: Intraindividual Comparison with Conventional Single-Source Transmission," Radiology 257(3), pp. 743-753 (2010).
Neuman & Block, "Optical trapping," Review of Scientific Instruments 75(9), pp. 2787-2809 (2004).
Obey & Vincent, "Novel Monodisperse "Silicone Oil"/Water Emulsions," Journal of Colloid and Interface Science 163(2), pp. 454-463 (1994).
Odete, et al., "The role of the medium in the effective-sphere interpretation of holographic particle characterization data," Soft Matter 16(4), pp. 891-898 (2019).

(56) References Cited

OTHER PUBLICATIONS

Odete, et al., "The role of the medium in the effective-sphere interpretation of holographic particle characterization data," Soft Matter 16(5), pp. 891-898 (2020).
Odumeru, et al., "Effects of heat shock and ethanol stress on the viability of a *Saccharomyces uvarum* (carlsbergensis) brewing yeast strain during fermentation of high gravity wort," Journal of Industrial Microbiology 10(2), pp. 111-116 (1992).
Omichi, et al., "Fabrication of enzyme-degradable and size-controlled protein nanowires using single particle nano-fabrication technique," Nature Communications 5, 3718, 8 pages (2014).
Orzada, et al., "Design and comparison of two eight-channel transmit/receive radiofrequency arrays for in vivo rodent imaging on a 7 T human whole-body MRI system," Medical Physics 37(5), pp. 2225-2232 (2010).
Ovryn & Izen, "Imaging of transparent spheres through a planar interface using a high-numerical- aperture optical microscope," Journal of the Optical Society of America A 17(7), pp. 1202-1213 (2000).
Owens, et al., "A Survey of General-Purpose Computation on Graphics Hardware," Computer Graphics Forum 26(1), pp. 80-113 (2007).
Pan, et al., "Three-Dimensional Particle Tracking for Dilute Particle-Liquid Flows in a Pipe," Measurement Science and Technology 13(8), pp. 1206-1216 (2002).
Panchal, et al., "Analyzing Subvisible Particles in Protein Drug Products: a Comparison of Dynamic Light Scattering (DLS) and Resonant Mass Measurement (RMM)," The AAPS Journal 16(3), pp. 440-451 (2014).
Parapouli, et al., "*Saccharomyces cerevisiae* and its industrial applications," AIMS Microbiology 6(1), pp. 1-31 (2020).
Parnell, et al., "Porosity of silica Stober particles determined by spin-echo small angle neutron scattering," Soft Matter 12, pp. 4709-4714 (2016).
Parthasarathy, "Rapid, accurate particle tracking by calculation of radial symmetry centers," Nature Methods 9, pp. 724-726 (2012).
Pawashe & Sitti, "Two-dimensional vision-based autonomous microparticle manipulation using a nanoprobe," Journal of Micromechatronics 3(3-4), pp. 285-306 (2006).
Pedregosa, et al., "Scikit-learn: Machine Learning in Python," Journal of Machine Learning Research 12, pp. 2825-2830 (2011).
Pelton, et al., "Transport and fractionation in periodic potential-energy landscapes," Physical Review E 70(3):031108, 11 pages (2004).
Perry, et al., "Real-space studies of the structure and dynamics of self-assembled colloidal clusters," Faraday Discussions 159, pp. 211-234 (2012).
Philips, et al., "Holographic characterization of contaminants in water: Differentiation of suspended particles in heterogeneous dispersions," Water Research 122, pp. 431-439 (2017).
Pine, et al., "Diffusing wave spectroscopy," Physical Review Letters 60(12), pp. 1134-1137 (1988).
Plumere, et al., "Stober silica particles as basis for redox modifications: Particle shape, size, polydispersity, and porosity," Journal of Colloid and Interface Science 368(1), pp. 208-219 (2012).
Polin, et al., "Optimized holographic optical traps," Optics Express 13(15), pp. 5831-5845 (2005).
Power & De Power, "Second-Kind Integral Equation Formulation for the Slow Motion of a Particle of Arbitrary Shape Near a Plane Wall in a Viscous Fluid," SIAM Journal on Applied Mathematics 53(1), pp. 60-70 (1993).
Pralle, et al., "Three-dimensional high-resolution particle tracking for optical tweezers by forward scattered light," Microscopy Research & Technique 44(5), pp. 378-386 (1999).
Pratt, et al., "The Effects of Osmotic Pressure and Ethanol on Yeast Viability and Morphology," Journal of the Institute of Brewing 109(3), pp. 218-228 (2003).
Pray, "L. H. Hartwell's Yeast: A Model Organism for Studying Somatic Mutations and Cancer," Nature Education 1(1), 3 pages (2008).

Quick, "Integrated PET/MR," Journal of Magnetic Resonance Imaging 39(2), pp. 243-258 (2014).
Rappaz, et al., "Erythrocytes volume and refractive index measurement with a Digital Holographic Microscope," Proceedings of SPIE—The International Society for Optical Engineering 6445, 644509, 5 pages. (2007).
Rappaz, et al., "Simultaneous cell morphometry and refractive index measurement with dual-wavelength digital holographic microscopy and dye-enhanced dispersion of perfusion medium," Optics Letters 33(7), pp. 744-746 (2008).
Remsen, et al., "Analysis of Large Particle Count in Fumed Silica Slurries and Its Correlation with Scratch Defects Generated by CMP," Journal of the Electrochemical Society 153(5), pp. G453-G461 (2006).
Ripple & Dimitrova, "Protein particles: What we know and what we do not know," Journal of Pharmaceutical Sciences 101(10), pp. 3568-3579 (2012).
Rodrigo, et al., "Four-dimensional optical manipulation of colloidal particles," Applied Physics Letters 86(7):074103, 3 pages (2005).
Roichman, et al., "Colloidal transport through optical tweezer arrays," Physical Review E 75:011407, 4 pages (2007).
Roichman, et al., "Influence of Nonconservative Optical Forces on the Dynamics of Optically Trapped Colloidal Spheres: The Fountain of Probability," Physical Review Letters 101, 128301, 5 pages (2008).
Roichman, et al., "Optical Forces Arising from Phase Gradients," Physical Review Letters 100:031602, 4 pages (2008).
Roichman, et al., "Optical traps with geometric aberrations," Applied Optics 45(15), pp. 3425-3429 (2006).
Roichman, et al., "Volumetric imaging of holographic optical traps," Optics Express 14(22), pp. 10907-10912 (2006).
Rommel, et al., "Contrast-enhanced digital holographic imaging of cellular structures by manipulating the intracellular refractive index," Journal of Biomedical Optics 15(4):041509, 10 pages (2010).
Rubinstein, et al., "Recognition of distorted patterns by invariance kernels," Pattern Recognition 24(10), pp. 959-967 (1991).
Sancho, et al., "Particle separation by external fields on periodic surfaces," Journal of Physics: Condensed Matter 17, pp. SF4151-SF4163, (2005).
Sasaki, et al., "Pattern formation and flow control of fine particles by laser-scanning micromanipulation," Optics Letters 16(19), pp. 1463-1465 (1991).
Savin & Doyle, "Role of a finite exposure time on measuring an elastic modulus using microrheology," Physical Review E 71, 041106, 6 pages (2005).
Savin & Doyle, "Static and Dynamic Errors in Particle Tracking Microrheology," Biophysical Journal 88(1), pp. 623-638 (2005).
Schellekens, "Bioequivalence and the immunogenicity of biopharmaceuticals," Nature Reviews Drug Discovery 1, pp. 457-462 (2002).
Schnars & Juptner, "Direct recording of holograms by a CCD target and numerical reconstruction," Applied Optics 33(2), pp. 179-181 (1994).
Sciammarella, et al., "Measuring Mechanical Properties of Materials in the Micron Range," Optical Engineering 42(5), 8 pages (2003).
Seifi, et al., "Fast and accurate 3D object recognition directly from digital holograms," Journal of the Optical Society of America A 30(11), pp. 2216-2224 (2013).
Seo, et al., "Lensfree holographic imaging for on-chip cytometry and diagnostics," Lab on a Chip 9(6), pp. 777-787 (2009).
Sheng, et al., "Digital holographic microscope for measuring three-dimensional particle distributions and motions," Applied Optics 45(16), pp. 3893-3901 (2006).
Shpaisman, et al., "Holographic microrefractometer," Applied Physics Letters 101, 091102, 3 pages (2012).
Siler & Cornish, "Measurement of Protein in Natural Rubber Latex," Analytical Biochemistry 229(2), pp. 278-281 (1995).
Simpson, et al., "Optical tweezers and optical spanners with Laguerre-Gaussian modes," Journal of Modern Optics 43(122), pp. 2485-2491 (1996).

(56) References Cited

OTHER PUBLICATIONS

Singh, et al., "An industry perspective on the monitoring of sub-visible particles as a quality attribute for protein therapeutics," Journal of Pharmaceutical Sciences 99(8), pp. 3302-3321 (2010).
Siposova, et al., "Depolymerization of insulin amyloid fibrils by albumin-modified magnetic fluid," Nanotechnology 23(5), 055101, 10 pages(2012).
Sluzky, et al., "Kinetics of insulin aggregation in aqueous solutions upon agitation in the presence of hydrophobic surfaces," Proceedings of the National Academy of Sciences 88(21), pp. 9377-9381 (1991).
Smola & Scholkopf, "A tutorial on support vector regression," Statistics and Computing 14(3), pp. 199-222 (2004).
Sohn, "Refractive Index of Porous Silicon," Handbook of Porous Silicon, pp. 231-243 (2014).
Sorensen, "Light Scattering by Fractal Aggregates: A Review," Aerosol Science and Technology 35(2), pp. 648-687 (2001).
Strzodka, et al., "Real-Time Motion Estimation and Visualization on Graphics Cards," IEEE Visualization 2004, pp. 545-552 (2004).
Sundbeck, et al., "Structure and scaling of helical modes of light," Optics Letters 30(5), pp. 477-479 (2005).
Svoboda & Block, "Biological Applications of Optical Forces," Annual Review of Biophysics and Biomolecular Structure 23(1), pp. 247-285 (1994).
Tennant, "Evaluation of the Trypan Blue Technique for Determination of Cell Viability," Transplantation 2(6), pp. 685-694 (1964).
Tolla & Boldridge, "Distortion of Single-Particle Optical Sensing (SPOS) Particle Count by Sub-Countable Particles," Particle & Particle Systems Characterizaion 27(1-2), pp. 21-31 (2010).
Van Oostrum, "Using Light Scattering to Track, Characterize and Manipulate Colloids," Utrecht University Repository, PhD Thesis, 321 pages (2011).
Verma, et al., "Entropic Colloidal Interactions in Concentrated DNA Solutions," Physical Review Letters 81(18), pp. 4004-4007 (1998).
Voros, "The Density and Refractive Index of Adsorbing Protein Layers," Biophysical Journal 87(1), pp. 553-561 (2004).
Wang, "Protein aggregation and its inhibition in biopharmaceutics," International Journal of Pharmaceutics 289(1-2), pp. 1-30 (2005).
Wang, et al., "Celebrating Soft Matter's 10th Anniversary: Monitoring colloidal growth with holographic microscopy," Soft Matter 11(6), pp. 1062-1066 (2015).
Wang, et al., "Holographic characterization of colloidal fractal aggregates," Soft Matter 12(42), pp. 8774-8780 (2016).
Wang, et al., "Holographic characterization of protein aggregates," Journal of Pharmaceutical Sciences 105(3), pp. 1074-1085 (2016).
Wang, et al., "Stimulus-responsive colloidal sensors with fast holographic readout," Applied Physics Letters 107(5), 051903, 5 pages (2015).
Wang, et al., "Using the discrete dipole approximation and holographic microscopy to measure rotational dynamics of non-spherical colloidal particles," Journal of Quantitative Spectroscopy and Radiative Transfer 146, pp. 499-509 (2014).
Weber, et al., "A Novel 8-Channel Transceive vol. Array for a 9.4T Animal Scanner," Proceedings of the International Society for Magnetic Resonance in Medicine 16, p. 151 (2008).
Weinbuch, et al., "Micro-Flow Imaging and Resonant Mass Measurement (Archimedes)—Complementary Methods to Quantitatively Differentiate Protein Particles and Silicone Oil Droplets," Journal of Pharmaceutical Sciences 102(7), pp. 2152-2165 (2013).
Winters, et al., "Quantitative Differentiation of Protein Aggregates From Other Subvisible Particles in Viscous Mixtures Through Holographic Characterization," Journal of Pharmaceutical Sciences 109(8), pp. 2405-2412 (2020).
Witten & Sander, "Diffusion-Limited Aggregation, a Kinetic Critical Phenomenon," Physical Review Letters 47(19), pp. 1400-1403 (1981).
Wu, et al., "Synthesis of mesoporous silica nanoparticles," Chemical Society Reviews 42(9), pp. 3862-3875 (2013).
Xiao & Grier, "Multidimensional Optical Fractionation of Colloidal Particles with Holographic Verification," Physical Review Letters 104, 028302, 4 pages (2010).
Xiao & Grier, "Sorting colloidal particles into multiple channels with optical forces: Prismatic optical fractionation," Physical Review E 82(5):051407, 9 pages (2010).
Xu, et al., "Digital in-line holography of microspheres," Applied Optics 41(25), pp. 5367-5375 (2002).
Xue, et al., "Diffusion, dispersion, and settling of hard spheres," Physical Review Letters 69(11), pp. 1715-1718 (1992).
Yang, et al., "Spatial coherence of forward-scattered light in a turbid medium," Journal of the Optical Society of America A 16(4), pp. 866-871 (1999).
Ye, et al., "Accelerating Magnetic Resonance Fingerprinting (MRF) Using t-Blipped Simultaneous Multislice (SMS) Acquisition," Magnetic Resonance in Medicine 75(5), pp. 2078-2085 (2016).
Yevick, et al., "Machine-learning approach to holographic particle characterization," Optics Express 22(22), pp. 26884-26890 (2014).
Yip, et al., "Atomic Force Microscopy of Crystalline Insulins: The Influence of Sequence Variation on Crystallization and Interfacial Structure," Biophysical Journal 74(5), pp. 2199-2209 (1998).
Yip, et al., "Structural and Morphological Characterization of Ultralente Insulin Crystals by Atomic Force Microscopy: Evidence of Hydrophobically Driven Assembly," Biophysical Journal 75(3), pp. 1172-1179 (1998).
Yu, et al., "The manipulation and assembly of CuO nanorods with line optical tweezers," Nanotechnology 15(12), pp. 1732-1736 (2004).
Zhang, et al., "Reconstruction algorithm for high-numerical-aperture holograms with diffraction-limited resolution," Optics Letters 31(11), pp. 1633-1635 (2006).
Zhao, et al., "Recording and reconstruction of a color holographic image by using digital lensless Fourier transform holography," Optics Express 16(4), pp. 2514-2519 (2008).
Zolls, et al., "How subvisible particles become invisible—relevance of the refractive index for protein particle analysis," Journal of Pharmaceutical Sciences 102(5), pp. 1434-1446 (2013).
Butime, et al., "Conoscopic holograms analysis using variations of the Hough transform," International Journal of Imaging Systems and Technology 19(1), pp. 10-13 (2009).

* cited by examiner

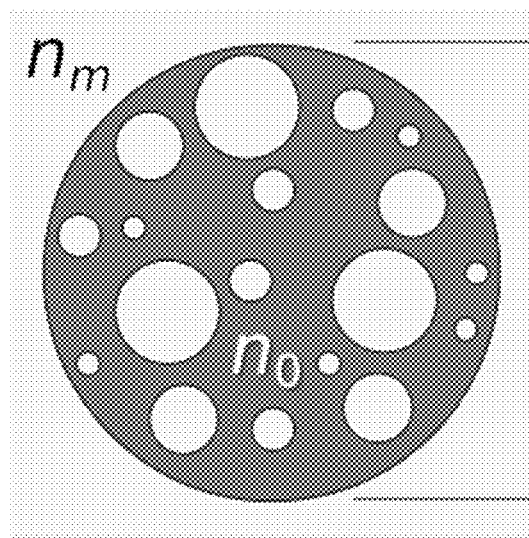
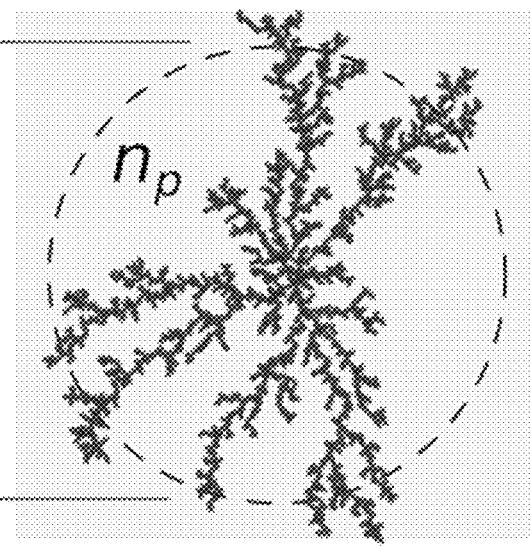
FIG. 1A
FIG. 1B
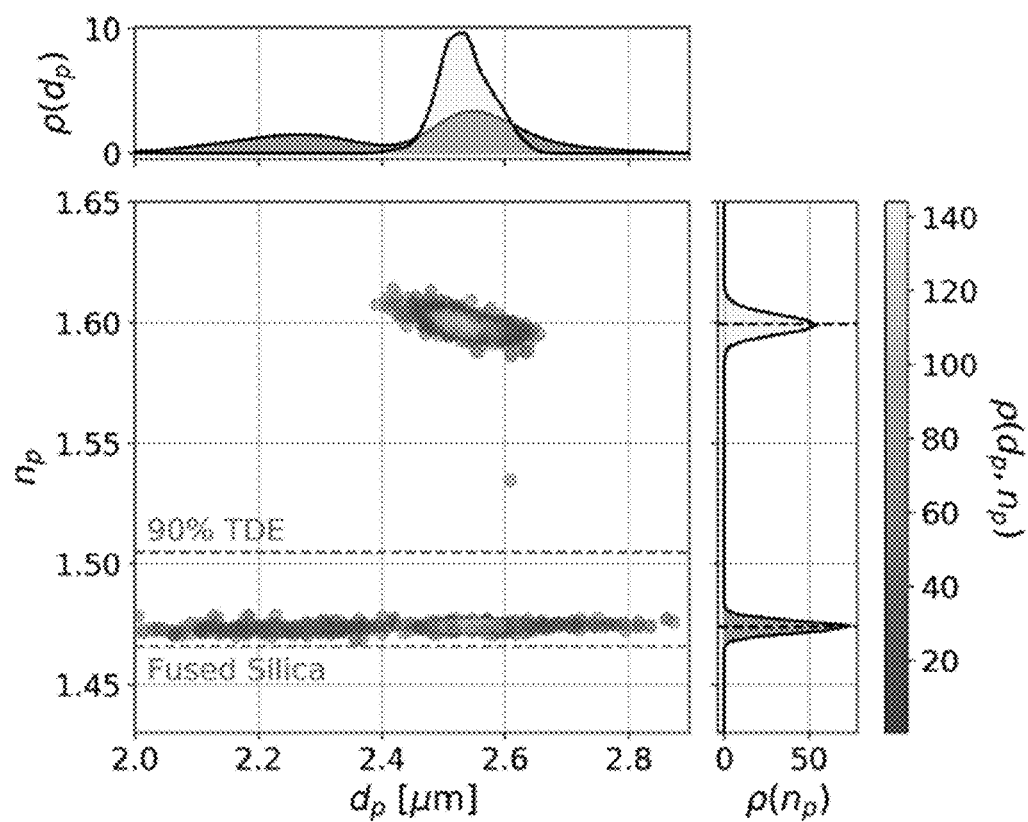
FIG. 2

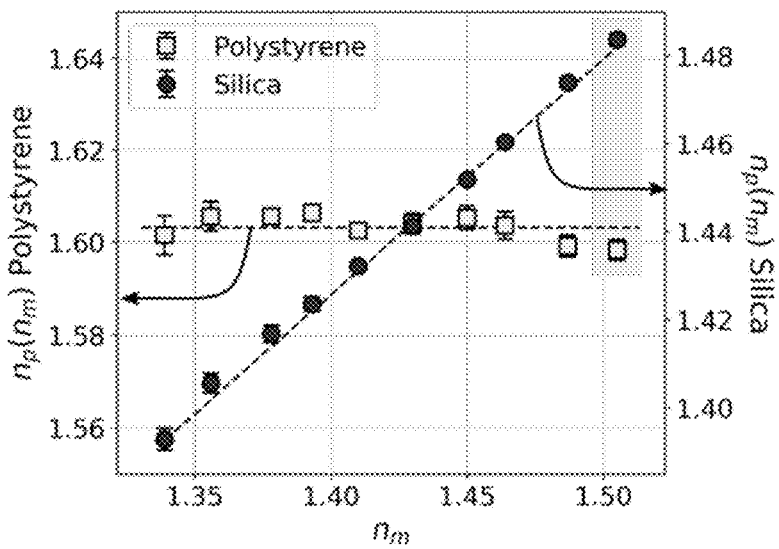
FIG. 3A
FIG. 3B
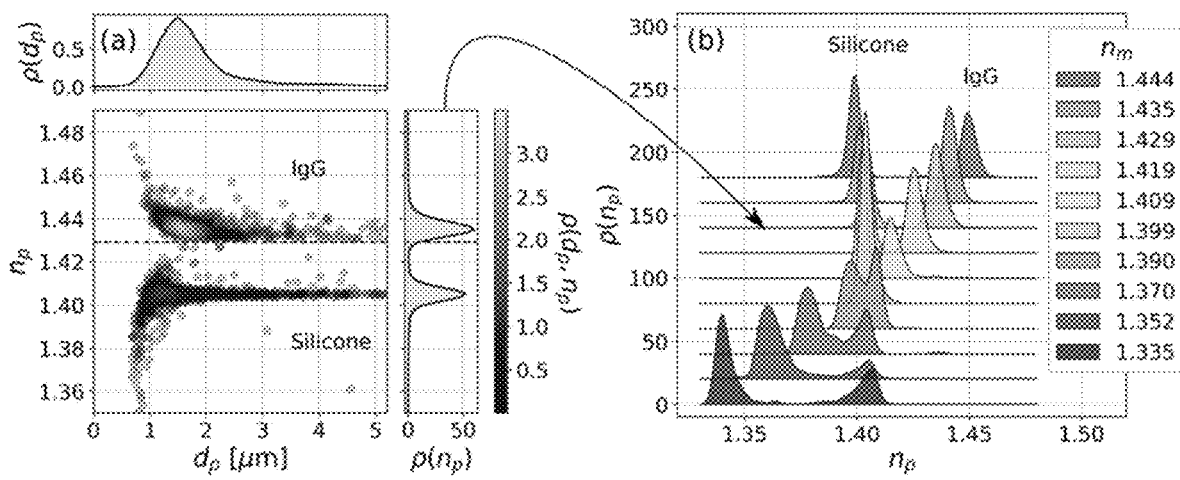
FIG. 4A
FIG. 4B

US 11,921,023 B2

HOLOGRAPHIC CHARACTERIZATION OF IRREGULAR PARTICLES

CROSS-REFERENCE TO RELATED APPLICATIONS

The present application is a continuation of U.S. patent application Ser. No. 17/079,167, filed Oct. 23, 2020, now U.S. Pat. No. 11,543,338, which claims the benefit of and priority to U.S. Provisional Patent App. No. 62/926,092 filed Oct. 25, 2019, both of which are incorporated by reference herein in their entireties.

TECHNICAL FIELD

The present disclosure relates generally to material analysis; more specifically to analysis of spherical particle properties and non-spherical particle properties by holographic video microscopy.

BACKGROUND

Holographic video microscopy ("HVM") was originally developed for analyzing spherical particles composed of homogeneous media (see, e.g., Lee, et al., "Characterizing and tracking single colloidal particles with video holographic microscopy," Optics Express 15(26), pp. 18275-18282 (2007), incorporated herein by reference). HVM systems are described in U.S. Pat. Nos. 9,810,894 and 8,791,985, incorporated herein by reference. HVM is a holographic particle characterization that uses predictions by light scattering theory to analyze holographic snapshots of individual particles or objects. The hologram is generated by interaction of a light source, typically a collimated light source (e.g., a laser), and image acquisition by a microscope coupled with a videography device. The interaction of the light with the particle results in a scattering pattern. The scattering pattern is recorded as a hologram. The hologram can be analyzed to identify properties of the particle, such as the particle's three-dimensional position, its radius, and its refractive index. A typical hologram subtends a 200×200 pixel array, with each pixel having a relative noise figure of 0.009, as determined by the median-absolute-deviation ("MAD") metric. This technique has been shown to work reliably for colloidal spheres ranging in radius from 400 nm to 4 µm.

While HVM was originally focused on the detection and characterization of spherical particles, a wide range of non-spherical materials exist that would benefit from the ability to utilize HVM, such as non-spherical materials (e.g., 2-D flakes), organic molecules (e.g., proteins), agglomerated or flocculated materials, or porous particles. However, the mathematical requirements for applying a similar fitting of a light theory for non-spherical particles has proven overly complicated and computationally taxing such that it presents a barrier for use of HVM with such particles. Further, these more complex materials present additional properties that would benefit from an analytical technique for probing them (e.g., determining porosity properties).

Thus, there is a need for a process and systems to enable HVM analysis with non-spherical materials and to probe such materials unique properties.

SUMMARY

The in-line hologram of a micrometer-scale colloidal sphere can be analyzed with the Lorenz-Mie theory of light scattering to obtain precise measurements of the sphere's diameter and refractive index. The same technique also can be used to characterize porous and irregularly shaped colloidal particles provided that the extracted parameters are interpreted with effective-medium theory to represent the properties of an equivalent effective sphere. In one embodiment described herein, the effective-sphere model consistently accounts for changes in the refractive index of the medium as it fills the pores of porous particles and therefore yields quantitative information about such particles' structure and composition. One embodiment provides these capabilities through measurements on mesoporous spheres, fractal protein aggregates and irregular nanoparticle agglomerates, all of which are noteworthy for their industrial significance.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore not to be considered limiting of its scope, the disclosure will be described with additional specificity and detail through use of the accompanying drawings.

FIGS. 1A-1B show effective-sphere model for porous spheres (FIG. 1A) and irregular clusters (FIG. 1B). The medium of refractive index $n_m$ fills the pores of a particle whose intrinsic refractive index is $n_0$. The effective sphere has refractive index n p intermediate between $n_m$ and $n_0$ and diameter $d_p$.

FIG. 2 shows the distribution of particles' diameters, $d_p$ and refractive indexes, $n_p$, with each point representing the holographically measured properties of a single particle. This sample is composed of monodisperse polystyrene spheres ($n_p \approx 1.6$) and mesoporous silica spheres co-dispersed in a mixture of 90% 2,2'-thiodiethanol ("TDE") in water. The two projections show the probability distribution of particle diameters and refractive indexes, the latter permitting clear differentiation between particle types. Horizontal dashed lines show the refractive indexes of fused silica and 90% TDE solution.

FIG. 3A shows the dependence of the population-averaged diameter, $d_p(n_m)$, and FIG. 3B shows the refractive index, $n_p(n_m)$, of the polystyrene and mesoporous silica spheres as a function of the refractive index of the medium, $n_m$. Neither the particles' diameters nor the measured refractive indexes of the polystyrene reference particles vary significantly with $n_m$. The refractive index of the mesoporous silica spheres depends on $n_m$ in agreement with Eq. 6. Error bars reflect population standard deviations for the two types of particles. Shaded boxes identify data from FIG. 2.

FIG. 4A shows the joint distribution of particle diameter and refractive index for a mixture of IgG aggregates and silicone oil emulsion droplets in a sucrose solution at refractive index $n_m=1.429$. Each analyzed particle is represented by a plot symbol, colored by the density of measurements, $\rho(d_p, n_p)$. The horizontal dashed line represents $n_m$. The two types of particles cannot be distinguished in the projected distribution of particle diameters, $\rho(d_p)$, but are clearly resolved in the distribution of refractive indexes, $\rho(n_p)$. FIG. 4B shows the projected refractive index distributions as a function of the medium's refractive index, $n_m$. Curves are offset by 20 RIU for clarity.

Figure 4C:
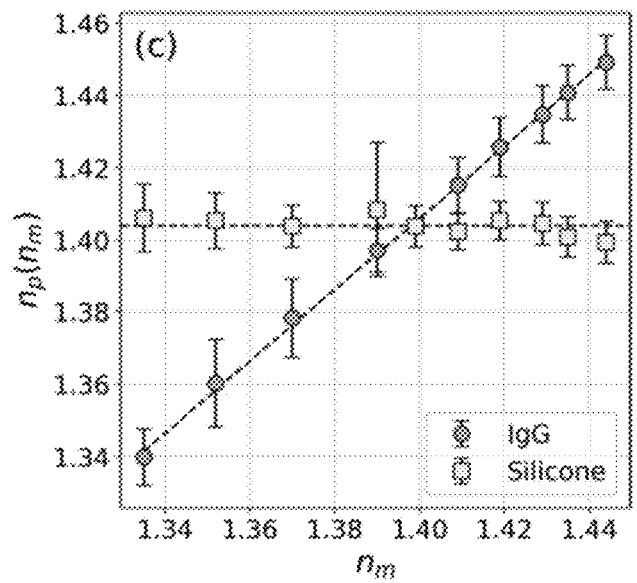
FIG. 4C shows the dependence of the mode refractive indexes for IgG and silicone particles as a function of $n_m$. The horizontal dashed line represents the bulk refractive index of silicone oil, 1.404±0.002. The diagonal curve is a fit to Eq. 6.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Holographic particle characterization is a high-throughput, low-cost technology that uses in-line holographic video microscopy to measure the diameters and refractive indexes of particles in their native media while simultaneously tracking their three-dimensional motions. It is compatible with any microfluidic system that provides access for optical microscopy. The measurement involves fitting a recorded hologram, pixel-by-pixel, to a model based on the Lorenz-Mie theory of light scattering by spheres. Colloidal particles with more complicated non-spherical materials can be analyzed by generalizing the light-scattering model at the cost of additional computational complexity.

Embodiments described herein relate generally to HVM, including HVM as applied to non-spherical particles (which may be solid or porous) and porous spherical particles ("irregular particles"). U.S. patent application Ser. No. 16/076,265, incorporated herein by reference, described systems and methods that utilize a determination of the properties of an effective sphere, one that includes the non-spherical material and the surrounding and interstitial fluid medium. The Lorenz-Mie model for spheres also can be used to analyze these more general particles. The extracted particle characteristics can be interpreted with effective-medium theory to describe an effective sphere, shown schematically in FIGS. 1A-1B, whose boundary encloses the actual particle and whose properties represent contributions from both the particle itself and also the medium filling its pores. This approach has been demonstrated experimentally through measurements on porous colloidal spheres, dimpled spheres, fractal clusters of silica nanoparticles, protein aggregates and nanoparticle agglomerates. It has been validated by analyzing simulated holograms of dimpled spheres and fractal clusters. Thus, an "effective sphere" model can be used to determine properties of irregular particles. Dimpled spheres and fractal clusters are examples of the more general class of non-ideal particles whose physical properties can be assessed by applying the Lorenz-Mie model together with the effective-sphere interpretation. These non-ideal particles can have properties drawn from the set of aspherical shape, inhomogeneous chemical composition or both. The one requirement for successful implementation is that the effective sphere should be no larger than the range of sphere diameters that can be usefully analyzed with the Lorenz-Mie model.

These previous studies all focused on the relationship between the particle's internal structure and the measured effective-sphere characteristics in a medium of fixed refractive index. Described herein are systems and methods, supported by experimental data, which provide a complementary analysis of the medium's role in determining the effective-sphere characteristics as well as extended analytics for identifying properties specific to the irregular particles. Experimental data below focuses on porous particles, specifically mesoporous silica spheres, as a "irregular" particle. As used herein, non-spherical includes but is not limited to protein aggregates with branched fractal structure and nanoparticle agglomerates dispersed in chemical-mechanical planarization ("CMP") slurries. Non-spherical particles, as a class of suitable subject particles, also includes coated spheres that are inhomogeneous because the coatings have optical properties distinct from those of the underlying sphere. Such coatings may be formed of atomic layers, molecular layers, layers of nanoparticles, layers of bound virus particles, or any other material that can be caused to bind to the surface of the sphere. The class of aspherical particles amenable to this technique include small aggregates of micrometer-scale spheres. These are physically distinct from fractal aggregates of nanoparticles in that the component spheres are large enough to be analyzed by Lorenz-Mie analysis by themselves, and that their clusters contain a small number of component spheres. These model systems were chosen for their relevance to drug delivery and catalysis, biopharmaceutical development and manufacturing, and semiconductor processing, respectively. The results of this study not only validate the effective-sphere model but also illustrate how to interpret holographic characterization data for the kinds of complex, multicomponent colloidal dispersions that are encountered in real-world applications.

In one embodiment, HVM is carried out using a basic setup where the microscope illuminates the sample with a collimated laser beam at vacuum wavelength $\lambda$. This incident wave can be modeled as a monochromatic plane wave propagating along $\hat{z}$ with linear polarization along $\hat{x}$:

$$E_0(r) = u_0 e^{ikz} \hat{x}. \quad \text{Eq. 1}$$

A small particle at $r_p$ scatters a portion of this field, $$E_s(r) = u_0 e^{ikz_p} f_s(k(r - r_p)), \quad \text{Eq. 2}$$

to position r in the focal plane of the microscope, where $k=2\pi n_m/\lambda$ is the wavenumber of the light in a medium of refractive index $n_m$, and $f_s(kr)$ is the Lorenz-Mie scattering function. The microscope magnifies the interference pattern formed by the incident and scattered fields, and relays it to a video camera. The recorded intensity is then divided by an image of the background illumination to obtain a normalized hologram that can be modeled as $$b(r)=|\hat{x}+e^{ikz_p}f_s(k(r-r_p))|^2. \quad \text{Eq. 3}$$

Through the Lorenz-Mie function, this expression for b(r) is parameterized by the sphere's diameter, $d_p$, and its refractive index, $n_p$, at the imaging wavelength. Fitting for these characterization data and the particle's position requires three calibration parameters: the wavelength of the illumination, the magnification of the optical train, and the refractive index of the medium.

Single-particle characterization measurements are combined into population distributions. Each point in this scatter plot reflects the measured diameter and refractive index of one particle. In one embodiment, the points are colored by the probability density of measurements, $\rho(d_p, n_p)$, such as computed using a kernel density estimator. Clusters of points reflect distinct populations of particles in the sample.

Effective Sphere Model

The Lorenz-Mie function, $f_s(kr)$, describes light scattering by an isotropic homogeneous sphere and is not inherently suitable for describing light scattering by porous, irregularly shaped or otherwise inhomogeneous particles. Generalizing $f_s(kr)$ to accommodate more general particle shapes is feasible but is computationally costly. The efficiency of the standard Lorenz-Mie implementation is retained by treating irregular and inhomogeneous particles as if they were homogeneous spheres whose measured properties then can be interpreted as averages over the media contained within their least bounding spheres, as suggested schematically in FIGS. 1A-1B.

The basis for this effective-sphere model is provided by Maxwell Garnett effective medium theory, according to which a particle composed of N different phases dispersed in a medium of refractive index $n_m$, has an effective refractive index, $n_p$, that satisfies the condition $$L_m(n_p)=\sum_{j=1}^{N}\phi_j L_m(n_j), \quad \text{Eq. 4a}$$

where the Lorentz-Lorenz function is $$L_m(n) = \frac{n^2 - n_m^2}{n^2 + 2n_m^2}, \quad \text{Eq. 4b}$$

and where $\phi_j$ is the volume fraction of the $j^{th}$ phase within the effective sphere. Eqs. 4a-4b reasonably describe the light-scattering properties of particles whose inhomogeneities are uniformly distributed when viewed on scales comparable to the wavelength of light.

Porous spheres and colloidal aggregates may be modeled as two-phase systems composed of a host material of refractive index $n_0$ at volume fraction $\phi$ whose pores are filled with the surrounding fluid medium, as shown schematically in FIGS. 1A-1B. Such a particle's porosity is related to its volume fraction by $p=1-\phi$. Noting that $L_m(n_m)=0$, the effective-sphere model then predicts $$L_m(n_p)=\phi L_m(n_0), \quad \text{Eq. 5}$$

so that the effective sphere's refractive index depends on that of the surrounding medium as $$n_p(n_m) = n_m\sqrt{\frac{1 - 2\phi L_m(n_0)}{1 + \phi L_m(n_0)}}. \quad \text{Eq. 6}$$

The effective sphere is index matched ($n_p=n_m$) in a medium that matches its host material, $n_m=n_0$. A non-porous sphere with $\phi=1$ has the refractive index of its material, $n_p=n_0$, as expected, and this value does not vary with the refractive index of the medium.

Polydispersity

The above discussion focused on how a porous particle's effective refractive index depends on its porosity and the refractive index of the medium. As noted, irregular particles present a range of properties that can be probed and analyzed but for which traditional HVM has not provided a method. For example, porous particles have several different parameters associated with their pores, including pore diameter, pore volume, and pore interconnection. Thus, one can measure the polydispersity of porosity for the particles in a sample. The same approach can be used to assess the properties of porous particles created by aggregation of colloidal spheres. In addition to being porous, such consolidated particles also are irregularly shaped.

The range, $\Delta n_p$, of apparent refractive indexes for clusters of a given size presumably reflects variations in the clusters' structures and therefore the spread, $\Delta\phi$, in values of j. Eq. 6 accounts for the dependence of $\Delta n_p$ on $\Delta\phi$ through:

$$\Delta n_p = \left|\frac{\partial n_p}{\partial \phi}\right|\Delta\phi = \frac{3}{2}\frac{n_m^2}{n_p}\frac{|L_m(n_0)|}{[1+\phi L_m(n_0)]^2}\Delta\phi. \quad \text{Eq. 7}$$

Most notably, this result shows that $\rho(n_p)$ narrows as the refractive index of the medium approaches that of the monomers because $L_m(n_p)=0$.

The ability, or inability, of probe particles, such as dissolved molecules or co-dispersed nanoparticles to permeate the particles' pores provides information about the size and connectivity of the particles' pores. One embodiment of an HVM system and process provides information regarding such. An unknown target particles may be analyzed in a medium co-dispersed with probe particles. The probe particle have known properties such as refractive index and diameter in some embodiments. Likewise, the medium may have known properties such as refractive index. The refractive index of the dispersed probe particles in the medium may also be known. One or more of the target particle are dispersed in the medium with the probe particles. Holographic characterization is done as discussed above, including the use of an effective sphere model. The refractive index of the effective sphere will comprise the refractive index of the target particle and the medium and, if the probe particles are able to enter the pores of the target particle, the effective sphere's refractive index will also reflect the presence of such probe particles. This process may be performed with various probe particle, such as varying their known diameter, to determine properties such as diameter of the pores of the target particles by identifying when the probe particles are within the pores (as reflected in the effective sphere refractive index) or not. In one embodiment, the target particles are spherical and the holographic characterization applies Lorenz-Mie theory but does not need to utilize the effective sphere analysis since the particles are spherical.

For example, if the particles' effective refractive index tracks the concentration of molecules, then one can conclude that the molecules can permeate the pores at their bulk concentration. In that case, it can be concluded that the pores are large enough to accommodate the molecules and are connected in such a way that the molecules can find their way in. If, conversely, the particles' effective refractive index does not track the concentration of molecules, it can be concluded that the pores cannot accommodate the molecules, either because the pores are too small, because they are inaccessible or because they are chemically inhospitable. Further information about the pore structure, functionality and accessibility can be obtained by repeating these measurements with different molecules of different sizes and different chemical properties. Thus, one embodiment relates to a screening method for providing HVM tests on samples with different known properties to determine the impact on the results and identify populations of particles that are change and those that are not changing with the changes in the tested sample, such as by adjusting the media/solvent's refractive index.

Further, just as dissolved molecules of known characteristics can be used as probe particles to probe the unknown pore structure of a target particle, well-characterized porous spheres can be used to assess the properties of unknown species in the fluid medium. The refractive index of the medium can be changed by adding a miscible fluid of known properties. If the effective refractive index of the sampled known porous spheres tracks (i.e., both increase, decrease, or stay the same, including, in some embodiments, the extent of change) the concentration of the unknown fluid with particles to be identified, then any molecules (nanoparticles) in the unknown fluid must be able to permeate the pores. If, conversely, the effective refractive index does not track the concentration of the unknown fluid, then that fluid contains molecules (or nanoparticles) that cannot permeate the pores. Repeating this measurement with different types of porous particles can help to identify the nature of the molecules (nanoparticles) in the unknown fluid. Multiple classes of porous particles can be combined to perform multiple variants of this test in parallel, the different classes of particles being distinguished by size, or by other characteristics such as the refractive index of the underlying material. Such aspect shall be referred to as holographic perfusion chromatography.

Experimental Results
Holographic Particle Characterization

The data for holographic particle characterization are acquired with in-line HVM. For the experimental setup, data acquisition and analysis were performed with a Spheryx xSight® device. Samples are loaded into xSight® in disposable xCell microfluidic sample chips, each of whose reservoirs holds 30 µL. xSight® mixes the sample and then transfers 3 µL through its holographic microscope using pressure gradients. The chip's observation volume has an optical path length of 50 µm and provides the microscope with a clear 150 µm×120 µm field of view, given the microscope's magnification of 120 nm/pixel. The instrument records holograms at $\lambda$=447 nm and can analyze particles ranging in size from $d_p$=400 nm to $d_p$=10 µm. A typical 15 min measurement can analyze particle concentrations as low as $10^3$ particles/mL and as high as $10^7$ particles/mL. The lower limit is set by counting statistics. The upper limit is set by the need to minimize overlap between holograms of multiple particles in the camera's field of view.

Single-particle characterization measurements are combined into population distributions such as the example in FIG. 2. Clusters of points reflect distinct populations of particles in the colloidal sample. In the case of FIG. 2, two populations are clearly distinguishable by their differing refractive indexes even though their size distributions overlap. The points are colored by the probability density of measurements, $\rho(d_p,n_p)$, computed using a kernel density estimator.

Results & Discussion
Effective-Sphere Characterization of Mesoporous Silica Spheres The effective-sphere model's predictions are tested by measuring the properties of well-characterized porous particles dispersed in media with a range of refractive indexes. The particles used for this study are nominally 2.5 µm-diameter mesoporous silica spheres with 4 nm-diameter pores (Sigma-Aldrich, catalog number 806951). These test particles are co-dispersed with 2.5 µm-diameter cross-linked polystyrene spheres (Spherotech, catalog number PP10-20-10), which serve as a control because they are not porous and should not respond in any way to changes in the properties of the medium.

Mesoporous silica spheres and polystyrene controls are dispersed at a total concentration of $10^6$ particles/mL in mixtures of deionized water and TDE (Sigma-Aldrich catalog number 166782, CAS No. 111-48-8). TDE is miscible with water and has a refractive index of 1.520 at the imaging wavelength, which substantially exceeds the value for fully dense fused silica, $n_0$=1.466.

The data in FIG. 2 were obtained with this system at 90% TDE by volume, which has a holographically-measured refractive index of $n_m$=1.510±0.007. The scatter plot shows results for 894 polystyrene spheres and 352 silica spheres. FIGS. 3A-3B summarize results from ten such data sets over the range from pure water ($n_m$=1.339±0.001) to 90% TDE. As anticipated, the measured properties of the polystyrene control particles (yellow squares) do not depend on the refractive index of the medium. Both the mean diameter of these spheres, $d_p$=(2.55±0.04) µm, and the refractive index, $n_p$=1.603±0.005, are consistent with the manufacturer's specification over the entire range of $n_m$.

The measured diameter of the mesoporous silica spheres also is insensitive to changes in $n_m$. The mean refractive index, by contrast, increases from $n_p$=1.339±0.001 in deionized water to $n_p$=1.482±0.001 in 90% TDE. The dashed curve through the refractive index data in FIG. 3B is a fit to Eq. 6 that tracks this trend and yields $n_0$=1.455±0.001 and $\phi$=0.46±0.01.

The 0.7% discrepancy between $n_0$ and the refractive index of fused silica may be ascribed in part to the well-documented difference in density between emulsion-polymerized silica and fused silica. The discrepancy also is likely to depend on the molecules' sizes and their affinity for silica, both of which affect their ability to access the particles' pores. Pores that are inaccessible to the high-index species in solution will tend to reduce a sphere's apparent porosity. The inaccessible volume being filled with low-index solvent, this effect also tends to reduce the apparent refractive index of the silica matrix.

Differences in accessibility may explain the subtle species-dependent variations in $n_0$ and porosity reported in Table 1. In addition to the results obtained with TDE, this table summarizes two additional series of measurements using glycerol (Sigma-Aldrich, catalog number G9012, CAS 56-81-5, refractive index 1.526±0.002) and saturated sucrose solution (Sigma-Aldrich, catalog number S8501, CAS 57-50-1, refractive index 1.501±0.002) to tune the refractive index of the aqueous medium. Both yield slightly smaller values for $n_0$ and p than TDE, and in both cases the differences are statistically significant. Sucrose is substantially bulkier than TDE, which suggests that the difference might be attributed to steric exclusion. Glycerol is comparable in size to TDE but nevertheless yields smaller values for $n_0$ and p. The difference in this case might reflect differences in the solute molecules' interactions with silica.

TABLE 1

Effective-sphere parameters for mesoporous silica spheres in media with varying refractive indexes. Specified high-index species are added to the aqueous medium to adjust the refractive index. Fitting the dependence of $n_p(n_m)$ to Eq. 6 yields the refractive index of the sphere's matrix, $n_0$, and the spheres' mean porosity, p.

| High-Index Species | $n_0$ | p |
|---|---|---|
| TDE | 1.455 ± 0.001 | 0.54 ± 0.01 |
| glycerol | 1.448 ± 0.001 | 0.51 ± 0.01 |
| sucrose | 1.444 ± 0.001 | 0.52 ± 0.01 |

Broadly speaking, all three results suggest that the mesoporous silica spheres have a mean porosity exceeding 50% in a matrix whose optical properties are consistent with low-density silica. Consistency among these results serves to validate the effective-sphere model's predictions for porous spheres. The subtle but significant differences in results obtained with different high-index species suggest that holographic porosimetry based on solvent perfusion may provide useful insights into pore structure and functionality.

Effective-Sphere Analysis of Protein Aggregates and Nanoparticle Agglomerates

Having successfully applied the effective-sphere model to mesoporous spheres, this is used to interpret holographic characterization data for irregularly shaped particles. FIG. 4A presents holographic characterization data for a mixture of protein aggregates and silicone oil emulsion droplets. The two populations cannot be distinguished by size, but are clearly differentiated by refractive index.

The aggregates in this sample are composed of human immunoglobulin G ("IgG") (Sigma-Aldrich catalog number 12511, MDL number MFCD00163923), dissolved in Tris buffer (Sigma-Aldrich, catalog number 648314, CAS number 77-86-1) at a concentration of 5 mg mL$^{-1}$. IgG is a protein that naturally tends to aggregate into branched fractal clusters. Holograms created by such clusters can be analyzed with the effective sphere model, as indicated schematically in FIG. 1B, to obtain estimates for each cluster's effective diameter and refractive index.

Emulsion droplets are created by manually agitating silicone oil (Sigma-Aldrich, product number 378399, CAS number 63148-62-9) in water. The emulsion then is blended into the protein solution at a concentration of 10$^5$ droplets/mL. Silicone oil droplets are common contaminants in biopharmaceutical products. In the present application, they serve as non-porous reference spheres.

Adding saturated sucrose solution to the buffer increases its refractive index. FIG. 4B shows how the measured distribution of refractive indexes, $p(n_p)$, depends on sucrose concentration through its influence on $n_m$. The data in FIG. 4A were obtained for a sample at $n_m$=1.429±0.002 and are reproduced in FIG. 4B. One peak in the bimodal distribution remains centered at refractive index of 1.404±0.002, which is consistent with the refractive index of bulk silicone oil. The other peak tracks changes in $n_m$ as anticipated by the effective sphere model. The former has been identified as the contribution of silicone oil droplets and the latter as reflecting the properties of protein aggregates.

The data in FIG. 4C show how the aggregates' mode refractive index, $n_p(n_m)$, responds to changes in $n_m$. The diagonal dashed curve is a fit to Eq. 6 that yields an effective volume fraction of $\phi$=0.03±0.03, which corresponds to a porosity of $\rho$=0.97±0.03. Such a high porosity is expected for fractal aggregates that have grown to many times the size of their monomers.

The effective-sphere model implicitly treats the aggregates as homogeneously porous particles whose internal structure is independent of size and buffer composition. Accounting for the fractal aggregates' size-dependent porosity does not change the magnitude of the observed porosity in the experimentally accessible size range. More importantly, the results presented in FIGS. 4A-4C offer insights into the particles' composition without requiring assumptions or a priori knowledge of their detailed structure.

Figure 5A:
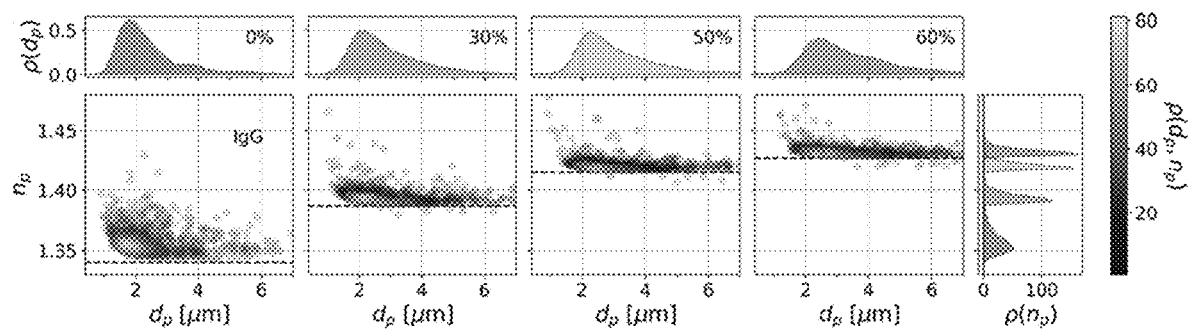
FIG. 5A shows holographic characterization data for protein aggregates dispersed in aqueous glycerol solutions at four different concentrations. Horizontal dashed lines indicate the refractive index of the medium, $n_m$.

FIG. 5A shows analogous characterization data for IgG aggregates when glycerol is used to adjust $n_m$ instead of sucrose. Results are presented for glycerol at 0%, 30%, 50%, and 60% by volume. The buffer's refractive index at each concentration is indicated by a horizontal dashed line. As with the sucrose data, the aggregates' measured refractive indexes track $n_m$. The mean porosity inferred from the mode values of $n_p(n_m)$ is $\rho$=0.97±0.03, which also is consistent with results obtained with sucrose. This is not to say that the aggregates have the same structure in the different media but that any structural changes are not apparent in the aggregates' overall porosity.

Figure 5B:
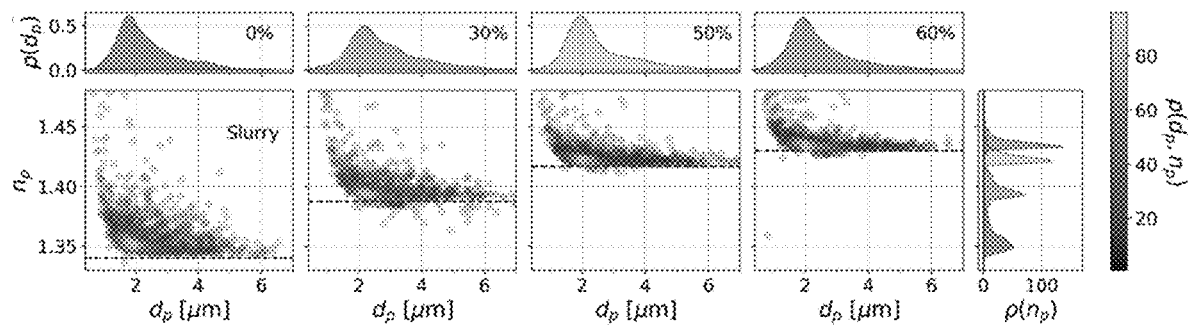
FIG. 5B shows agglomerates of silica nanoparticles dispersed in a nanoparticle slurry whose refractive index and viscosity is adjusted with four different concentrations of glycerol.

Analogous results are plotted in FIG. 5B for nanoparticle agglomerates in a slurry of silica nanoparticles (General Engineering & Research 80 nm, SIO2-743). Unless stabilized by added surfactants, nanoparticles in this slurry also tend to agglomerate into fractal clusters. This system also is noteworthy because the population of dispersed nanoparticles render the slurry turbid. Holographic particle characterization previously has been shown to be effective for characterizing micrometer-scale particles in such media.

The effective refractive index of nanoparticle agglomerates tracks the refractive index of the medium, as anticipated by the effective sphere model. Also as expected, the size distribution of nanoparticle agglomerates appears not to vary appreciably with the addition of glycerol. It is believed that these agglomerates also are highly porous and that their pores are perfused by the fluid medium. Reproducing these trends in such physically distinct systems as protein aggregates and nanoparticle agglomerates lends further credibility to the effective-sphere interpretation of irregular clusters' light-scattering properties.

Polydispersity of Porosity

The projected refractive index distributions in FIGS. 5A-5B not only shift upward as nm increases, but also become more narrow. The range, $\Delta n_p$, of apparent refractive indexes for clusters of a given size presumably reflects variations in the clusters' structures and therefore the spread, $\Delta\phi$, in values of $\phi$.

Figures 6A, 6B:
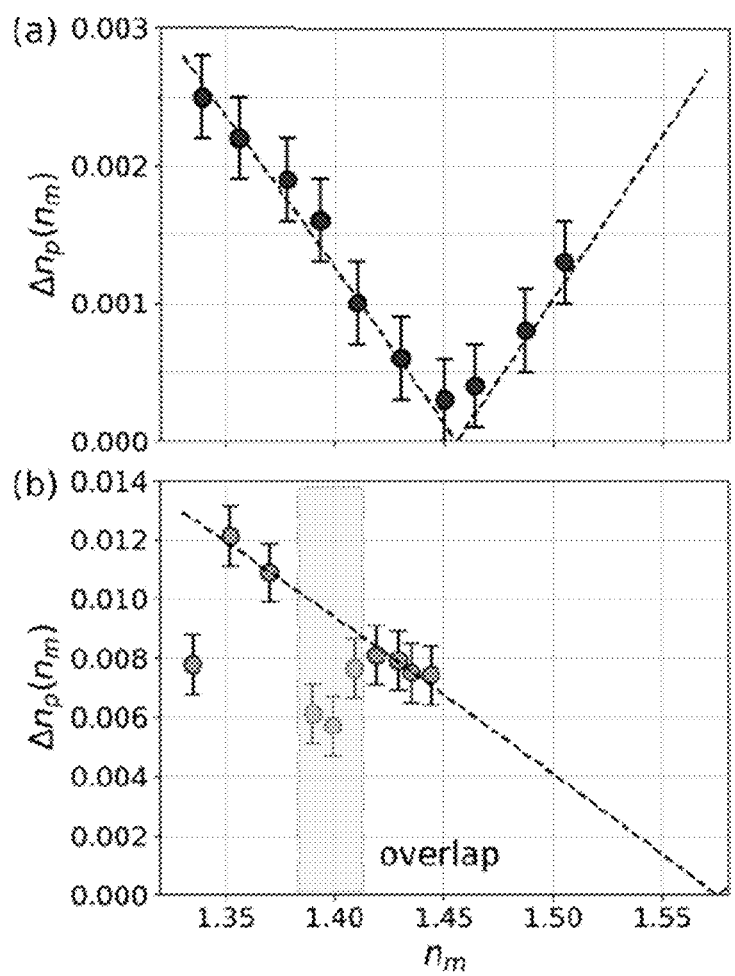
FIG. 6A shows the width of the refractive index distribution, $\Delta n_p(n_m)$, for mesoporous silica spheres dispersed in aqueous TDE solution spheres as a function of the medium's refractive index, $n_m$.
FIG. 6B shows $\Delta n_p(n_m)$ for protein aggregates in buffer with added sucrose, from FIGS. 4A-4C. Widths are unreliable in the shaded region where the distribution of protein aggregates overlaps with the distribution of silicone oil droplets. Dashed curves are fits to Eq. 7.

FIG. 6A shows the result of applying this analysis, applying Eq. 6, to the data for mesoporous silica spheres dispersed in TDE. The width of the refractive index distribution at each value of nm is estimated with robust principal component analysis, as is the uncertainty of the width. The dashed curve in a one-parameter fit to Eq. 7 for $\Delta\phi$ using the value of $n_0$=1.455 obtained from $n_p(n_m)$. The result, $\Delta\phi$=0.023±0.001, is consistent with a 4% polydispersity in these particles' porosity.

Applying the same analysis to the data for protein aggregates in sucrose solution yields the results in FIG. 6B. The widths of the distributions cannot be assessed reliably in the range of $n_m$ for which the silicone oil distribution overlaps with the aggregate distribution, which is indicated by the shaded region. Fitting the remainder of the data to Eq. 7 yields $\Delta\phi=0.05\pm0.02$ and $n_0=1.575\pm0.008$. This value for the monomer refractive index is consistent with expectations for proteins such as IgG.

CONCLUSIONS

The experimental studies presented here demonstrate that the effective-sphere model usefully accounts for the properties of porous spheres and irregularly shaped colloidal particles as reported by Lorenz-Mie analysis of holographic microscopy data. Specifically, these studies validate the predicted role of the medium in establishing a porous particle's effective refractive index. This dependence is characteristic of porous particles and can be used to differentiate them from non-porous particles, such as the polystyrene spheres and silicone oil droplets used as references in this study.

Fitting measurements of $n_p(n_m)$ to Eq. 6 yields estimates for the particles' porosity and the refractive index of their matrix. These characterization results are found to depend on the choice of compounds used to adjust the medium's refractive index. Tracking this dependence may be useful for probing the size distribution, connectivity and surface functionality of the pores within porous particles.

Changes in the medium that affect the refractive index also influence other physical properties. The viscosity of the samples in FIGS. 3A-3B, for example, increases from $1\times10^{-3}$ Pa s in pure water to $6\times10^{-3}$ Pa s in 90% TDE. Consistent characterization results for polystyrene standards demonstrate that the approach to holographic particle characterization implemented in xSight® is insensitive to such ancillary effects.

The ability of holographic particle characterization to differentiate porous colloidal particles from non-porous particles has immediate applications for assessing the quality of protein-based biopharmaceutical products and nanoparticle-based CMP slurries used for semiconductor manufacturing. Monitoring solute perfusion in mesoporous particles may provide an approach to porosimetry that complements mercury intrusion, helium isotherms, and electron microscopy, with particular benefits for analyzing the pore structure of colloidal materials.

Definitions

As used herein, the singular forms "a," "an," and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

As used herein, the terms "coupled," "connected," and the like mean the joining of two additional intermediate members being integrally formed as a single unitary body with one another or with the two members or the two members and any additional intermediate members being attached to one another.

Figure 7:
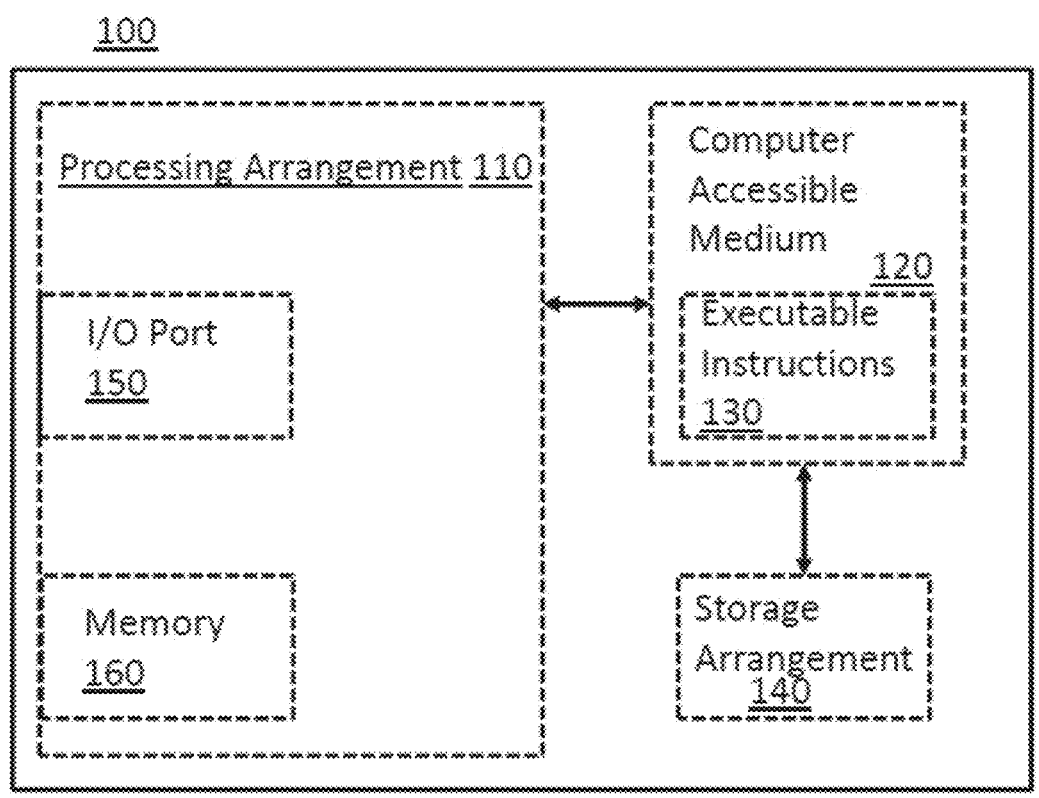
FIG. 7 illustrates a computer system for use with certain implementations.

As shown in FIG. 7, e.g., a computer-accessible medium 120 (e.g., as described herein, a storage members directly or indirectly to one another. Such joining may be stationary (e.g., permanent) or moveable (e.g., removable or releasable). Such joining may be achieved with the two members or the two members and any device such as a hard disk, floppy disk, memory stick, CD-ROM, RAM, ROM, etc., or a collection thereof) can be provided (e.g., in communication with the processing arrangement 110). The computer-accessible medium 120 may be a non-transitory computer-accessible medium. The computer-accessible medium 120 can contain executable instructions 130 thereon. In addition or alternatively, a storage arrangement 140 can be provided separately from the computer-accessible medium 120, which can provide the instructions to the processing arrangement 110 so as to configure the processing arrangement to execute certain exemplary procedures, processes and methods, as described herein, for example. The instructions may include a plurality of sets of instructions.

System 100 may also include a display or output device, an input device such as a key-board, mouse, touch screen or other input device, and may be connected to additional systems via a logical network. Many of the embodiments described herein may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art can appreciate that such network computing environments can typically encompass many types of computer system configurations, including personal computers, hand-held devices, multi-processor systems, microprocessor-based or programmable consumer electronics, network PCs, mini-computers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Various embodiments are described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, are intended to encompass implementations using one or more lines of software code, and/or hardware implementations, and/or equipment for receiving manual inputs.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method of characterizing particles, comprising:
dispersing within a fluid medium a plurality of porous particles, having a known diameter and refractive index, and a plurality of unknown particles to form a mixture;
flowing a sample of the mixture through an observation volume of a holographic microscope;
generating a first holographic image based upon holographic video microscopy of the sample within the observation volume at a first time;
analyzing the first holographic image for one or more regions of interest corresponding to a porous particle of interest;
normalizing the one or more regions of interest for a contribution of a wave created by interaction of light with the sample;
fitting the normalized region of interest to a light scattering theory; and
characterizing the refractive index of the porous particle of interest;
adding a miscible fluid to the sample mixture, forming a modified mixture;
flowing a modified mixture sample through the observation volume of the holographic microscope;
generating a second holographic image based upon holographic video microscopy of the modified mixture sample within the observation volume at a second time;
analyzing the second holographic image for one or more second regions of interest corresponding to a second porous particle of interest;
normalizing the one or more second region of interest for a contribution of a wave created by interaction of light with the modified mixture sample;
fitting the normalized second region of interest to the light scattering theory; and
characterizing the refractive index of the second porous particle of interest;
comparing the refractive index of the second porous particle of interest to the refractive index of the porous particle of interest; and
determining by the comparison of refractive indices if the unknown particle is present in pores of the plurality of porous particles.

2. The method of claim 1, wherein the porous particle of interest comprises a plurality of aggregated colloidal spheres.

3. The method of claim 1, wherein the porous particle of interest comprises a particle with a coating.

4. The method of claim 1, wherein fitting the normalized region of interest to a light scattering theory includes applying an effective sphere model through a Lorenz-Mie function to determine the reflective index of an effective sphere surrounding the porous particle of interest.

5. A method of analyzing a sample comprising:
performing first holographic characterization of a first target particle of a group of target particles, the first target particle co-dispersed with first probe particles in a first medium;
determining a first refractive index for the first target particle;
performing a second holographic characterization of a second target particle of the group of target particles, the second target particle co-dispersed with second probe particles in a second medium;
determining a second refractive index the second target particle; and
characterizing one or more properties of the group of target particles based on a comparison of the first refractive index and the second refractive index.

6. The method of claim 5, wherein the first medium and the second medium are the same.

7. The method of claim 5, wherein the first probe particle, the first medium, the second probe particle, and the second medium each have a known refractive index.

8. The method of claim 5, wherein the first probe particle and the second probe particle have different diameters.

* * * * *